(12) United States Patent
Takahashi et al.

(10) Patent No.: US 6,493,010 B1
(45) Date of Patent: Dec. 10, 2002

(54) COLOR IMAGE FORMING APPARATUS FOR FORMING A PLURALITY OF SINGLE-COLOR IMAGES ON A LATENT IMAGE CARRIER

(75) Inventors: Masaki Takahashi, Yokohama (JP); Norio Yoshikawa, Yokohama (JP); Hideki Ito, Yokohama (JP); Yasuhiro Yokota, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/429,903

(22) Filed: Oct. 29, 1999

(30) Foreign Application Priority Data

| Oct. 30, 1998 | (JP) | 10-311366 |
|---|---|---|
| Nov. 24, 1998 | (JP) | 10-332848 |
| Mar. 23, 1999 | (JP) | 11-077950 |

(51) Int. Cl.[7] ................ B41J 2/385; G01D 15/06; G03G 15/01
(52) U.S. Cl. ................ 347/116; 347/234
(58) Field of Search ................ 347/116, 134, 347/137, 241, 244, 232, 233, 234, 248

(56) References Cited

U.S. PATENT DOCUMENTS

| 4,937,664 A | | 6/1990 | Chiku et al. | |
|---|---|---|---|---|
| 5,175,570 A | * | 12/1992 | Haneda et al. | 347/116 |
| 5,291,223 A | | 3/1994 | Ogane et al. | |
| 5,302,973 A | * | 4/1994 | Costanza et al. | 347/116 X |
| 5,315,321 A | * | 5/1994 | Peled et al. | 347/241 X |
| 5,359,434 A | * | 10/1994 | Nakao et al. | |
| 5,381,167 A | * | 1/1995 | Fujii et al. | 347/116 |
| 5,634,171 A | * | 5/1997 | Muto | |
| 5,963,240 A | * | 10/1999 | Shinohara et al. | 347/116 |

FOREIGN PATENT DOCUMENTS

| JP | 62-115474 | * | 5/1987 |
|---|---|---|---|
| JP | 4-264468 | * | 9/1992 |
| JP | 4-308771 | | 10/1992 |
| JP | 4-321065 | | 11/1992 |
| JP | 4-321066 | * | 11/1992 |
| JP | 4-340562 | * | 11/1992 |
| JP | 4-340563 | * | 11/1992 |
| JP | 5-80631 | * | 4/1993 |
| JP | 6-160742 | * | 6/1994 |
| JP | 10-157197 | * | 6/1998 |
| JP | 10-215365 | * | 8/1998 |
| JP | 11-38738 | * | 2/1999 |

* cited by examiner

Primary Examiner—Susan S. Y. Lee
(74) Attorney, Agent, or Firm—Oblon, Spivak, McClelland, Maier & Neustadt, P.C.

(57) ABSTRACT

A color image forming apparatus irradiates a photosensitive drum with exposure light beams to form a plurality of latent images, develops the latent images into visible images, overlies the visible image to form a color image, and transfers the color image to recording paper. In this apparatus, a light reflection surface is formed on the photosensitive drum. Reflected light beams of laser beams from this light reflection surface are detected by a photodetector. The relative positions of the plurality of latent images formed by the laser beams are corrected in accordance with the detection signal from the photodetector. The image registration error of the color image can be accurately corrected without wasting toner or requiring an accurate toner mark detector, and a high-quality color image can be formed at a high speed with a simple arrangement.

10 Claims, 20 Drawing Sheets

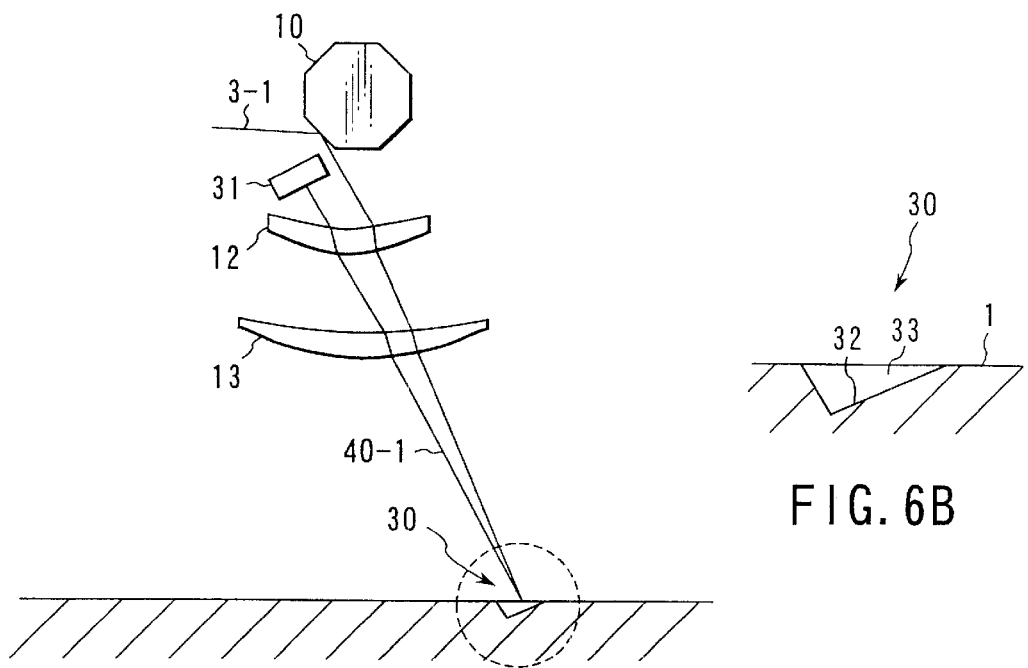
FIG. 6A
FIG. 6B
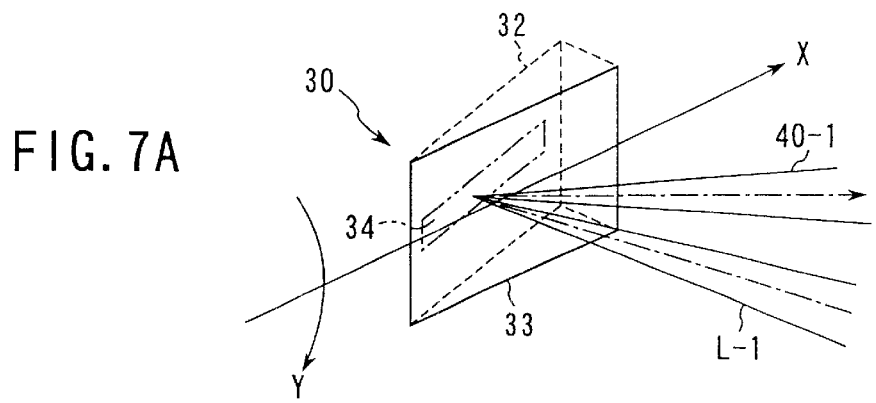
FIG. 7A
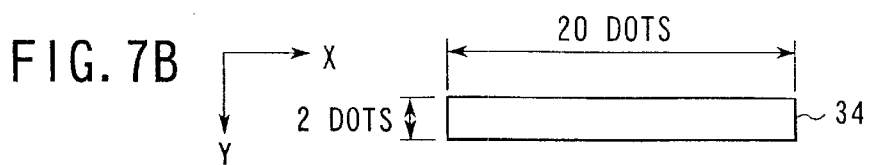
FIG. 7B

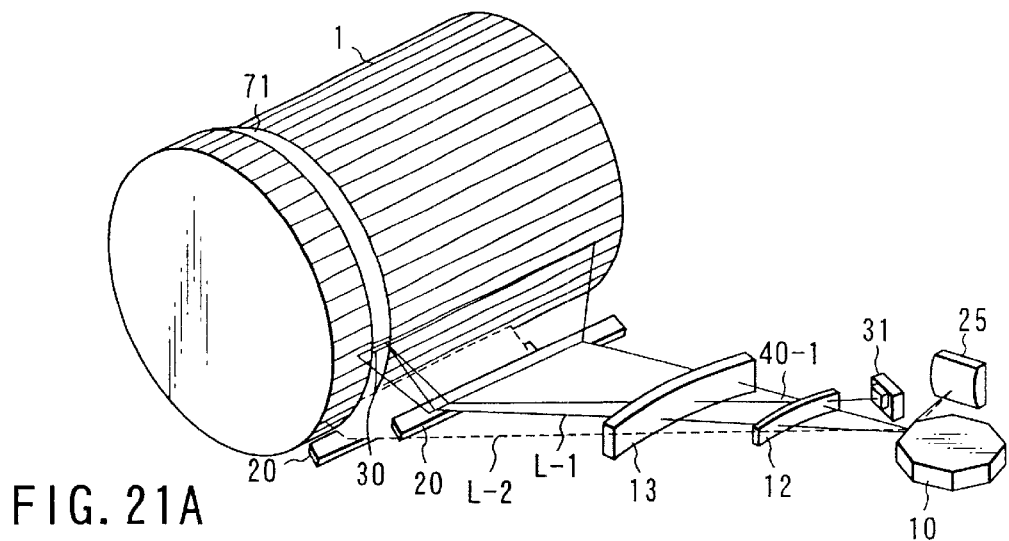
FIG. 21A
FIG. 21B
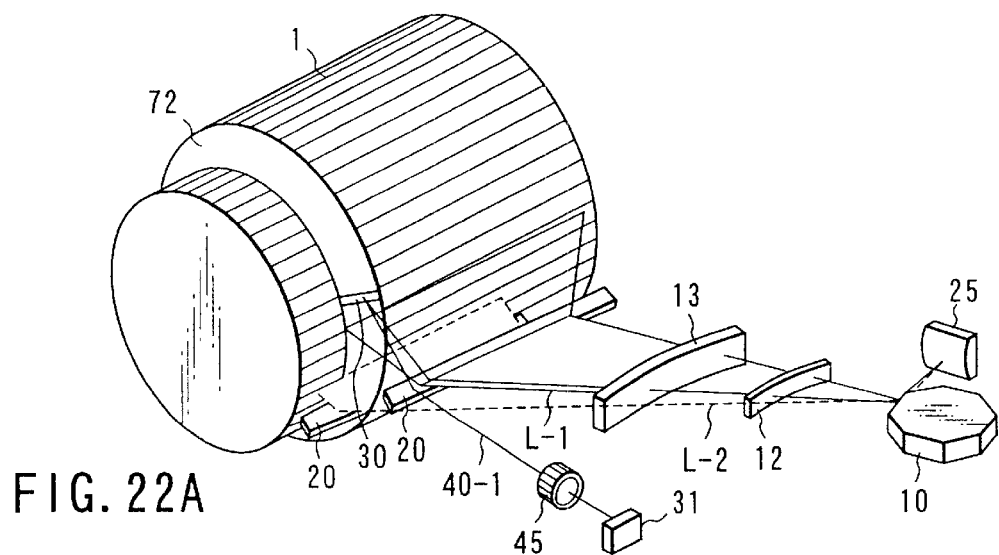
FIG. 22A
FIG. 22B

COLOR IMAGE FORMING APPARATUS FOR FORMING A PLURALITY OF SINGLE-COLOR IMAGES ON A LATENT IMAGE CARRIER

BACKGROUND OF THE INVENTION

The present invention relates to an electrophotographic color image forming apparatus and, more particularly, to a color image forming apparatus for forming a plurality of single-color images on a latent image carrier and sequentially registering the images to form a color image.

An electrophotographic color image forming apparatus which forms an electrostatic latent image on a photosensitive drum, forms a visible image from the latent image using toners, and transfers the image to recording paper, uses various schemes. For example, the following schemes are used. (1) A process of forming, on a photosensitive drum, a toner image of one of three primary colors (yellow, magenta, and cyan) for forming a color image, and transferring the toner image to recording paper is repeated three times in correspondence with the colors (or four times, including black, as needed). (2) Image forming units for forming single-color toner images are arranged in the recording paper convey direction in correspondence with the three primary colors and black. Single-color images are sequentially registered on recording paper to form a color image. (3) Image forming units are arranged in the photosensitive drum moving direction in correspondence with the primary colors. Single-color images are sequentially registered on the surface of the photosensitive drum to form a color image and transferred to recording paper at once. Scheme (3) includes dry electrophotography using dry toners and wet electrophotography using liquid developers containing fine toners.

In the above-described schemes, to form a satisfactory color image, single-color images must be accurately registered. If this registration accuracy is not sufficiently high, the image quality degrades: image blur or a shortage of sharpness or color reproducibility occurs. A registration accuracy at which the registration error is not visually recognized and a high image quality is obtained is generally 0.1 mm or less.

Conventionally, various proposals have been made in order to improve the registration accuracy. For example, in a color image forming apparatus with a tandem arrangement, marks for detecting the registration errors of single-color images are formed on the recording paper conveyor belt, and the image formation position is corrected on the basis of detected registration error data.

In this technique, however, toner consumption increases because of formation of registration error detection marks, a cleaning unit for removing unnecessary marks that remain after detection and are not associated with the output image must be added, the photosensitive material degrades due to mechanical stress in cleaning, the recording time is prolonged by the loss time for registration error detection, and cost increases because of the necessity of a detector for accurately detecting the marks. Additionally, running cost increases, including the cost of photosensitive material and toner.

Assume that a detector for accurately detecting a registration error detection mark formed from a toner pixel with a dot size associated with the recording resolution is realized to detect the registration errors of the single-color images. When the allowable registration error amount is about 0.1 mm, the detection accuracy of the detector itself must be increased to 0.02 mm or less in consideration of the accuracy allotment by analysis of registration error generating factors and analysis of errors in constituent elements of the image forming apparatus. In addition, since the image forming process for forming marks or constituent element driving accuracy varies, the detection accuracy must be increased by detecting a plurality of marks and statistically processing them. This increases not only load on hardware including the detector but also load on software for the detection sequence.

There is a technique of accurately registering images by multiple-exposure in which one of a plurality of exposure laser beams is used as a reference, and the remaining beams are synchronized with the reference beam. In this technique, however, measures against an image registration error generated by a shift in beam image formation position due to a thermal deformation of an optical system element according to a change in ambient temperature or an image position shift due to a shift in the relative positions of each laser beam and the photosensitive drum in exchanging the photosensitive drum are not particularly considered.

When the photosensitive drum driving speed has a slight error, an image registration error occurs due to this speed error. In addition, since a mechanism for attaching, at a sufficiently high accuracy, a photosensitive material which is expendables and must be exchanged several ten times during the service life of the apparatus is required, the apparatus arrangement becomes complex. Furthermore, the photosensitive material driving speed need also be accurately set. Hence, a drive transmission mechanism with high mechanical accuracy and photosensitive driving by accurate speed control are necessary, resulting in an increase in cost of the apparatus.

There is a technique of decreasing the positional shift between color toner images to increase the registration accuracy, in which support members are provided around the photosensitive drum to increase the positioning accuracy of the image exposure devices. However, along with the recent requirement for a high-speed high-resolution color image forming apparatus, strong demand has arisen for improvement of the registration accuracy of color toner images. No sufficient registration accuracy is obtained only with the positioning accuracy of units.

BRIEF SUMMARY OF THE INVENTION

Accordingly, it is an object of the present invention to provide a color image forming apparatus capable of accurately correcting a registration error in color images and forming a high-quality color image at a high speed.

According to one aspect of the present invention, there is provided a color image forming apparatus comprising: a latent image carrier; an image exposure mechanism configured to scan a surface of the latent image carrier with exposure light beams in accordance with image information of different colors to form a plurality of latent images; a development mechanism configured to develop the plurality of latent images formed by the image exposure mechanism into visible images to form a color image on the latent image carrier; at least one reflector provided on the latent image carrier; at least one detector for detecting reflected light beams of the exposure light beams from the at least one reflector and outputting a detection signal; and a correction mechanism configured to control relative positions of the plurality of latent images to be formed by the image exposure mechanism, on the basis of the detection signal from the at least one detector.

According to another aspect of the present invention, there is provided a color image forming apparatus comprising: a latent image carrier; an image exposure mechanism configured to scan a surface of the latent image carrier with exposure light beams in accordance with image information of different colors to form a plurality of latent images; a development mechanism configured to develop the plurality of latent images formed by the image exposure mechanism into visible images to form a color image on the latent image carrier; a reflector provided on the latent image carrier, the reflector having a plurality of reflection members; a detector for detecting reflected light beams of the exposure light beams from at least one of the plurality of reflection members and outputting a detection signal; and a correction mechanism configured to control relative positions of the plurality of latent images to be formed by the image exposure mechanism, on the basis of the detection signal from the detector.

According to still another aspect of the present invention, there is provided a color image forming apparatus comprising: a latent image carrier; a plurality of image exposure units for forming, on a surface of the latent image carrier, latent images of exposure light beams in accordance with image information of different colors by exposure; a plurality of development units for developing the latent images formed by the plurality of image exposure units into visible images to form a color image on the latent image carrier; a detection pattern formation mechanism configured to form, on the latent image carrier using at least one of the plurality of image exposure units, a plurality of detection patterns used to detect at least one of a relative difference and a tilt angle of each of the visible image formation positions of the plurality of development units; a detector for detecting the plurality of detection patterns; and a correction mechanism configured to obtain at least one of the relative difference and the tilt angle on the basis of a detection result from the detector and control relative positions of the latent images to be formed by the plurality of image exposure units, on the basis of the obtained relative difference or tilt angle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIGS. 6A and 6B are views showing the layout of the optical system and the structure of an optical reflection surface in the first embodiment;

FIGS. 7A and 7B are views showing the structure of the optical reflection surface in the first embodiment in more detail;

FIGS. 21A and 21B are perspective and side views, respectively, showing the arrangement of main part of a color image forming apparatus according to the sixth embodiment of the present invention;

FIGS 22A and 22B are perspective and side views, respectively, showing the arrangement of main part of a color image forming apparatus according to the seventh embodiment of the present invention;

DETAILED DESCRIPTION OF THE INVENTION

The embodiments of the present invention will be described below with reference to the accompanying drawing.

(First Embodiment)

Figure 1:
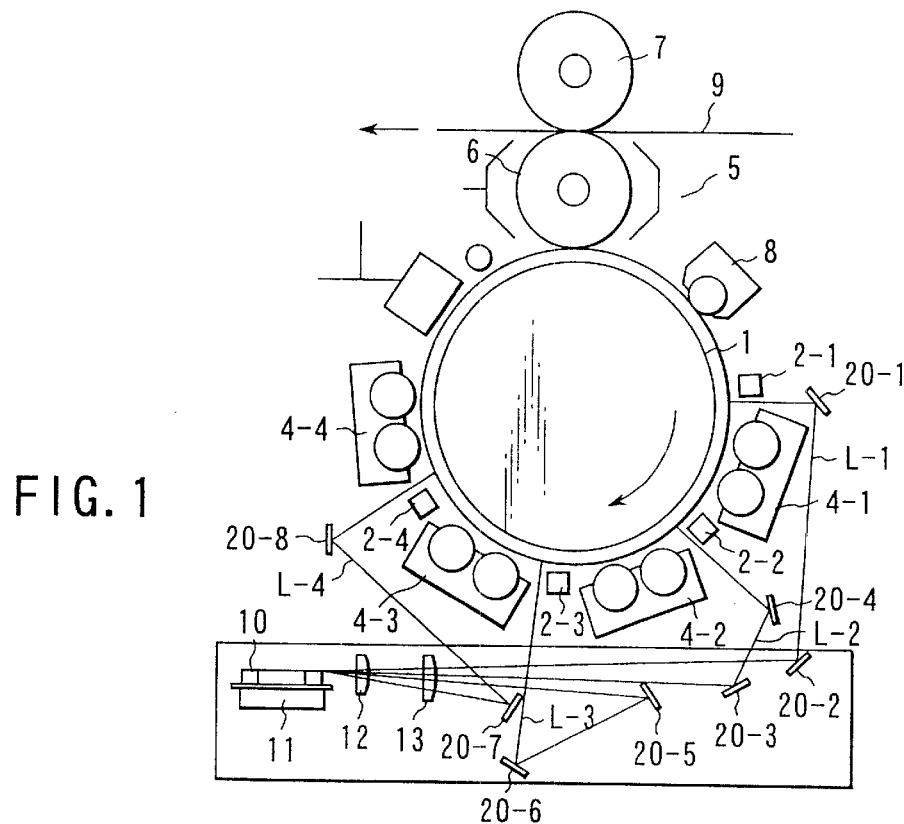
FIG. 1 is a side view showing the schematic arrangement of a color image forming apparatus according to the first embodiment of the present invention.

FIG. 1 shows the arrangement of a color image forming apparatus according to the first embodiment of the present invention.

A photosensitive drum 1 as an electrostatic latent image carrier is constructed by forming an organic or amorphous-silicon-based photosensitive layer on a cylindrical conductive base. The photosensitive drum 1 sequentially passes charging, exposure, and development stations at four positions around the photosensitive drum 1, which are separated in the direction of rotation/movement (to be referred to as a sub-scanning direction hereinafter), while being rotated by a motor (not shown) in the direction of the arrow.

The photosensitive layer of the photosensitive drum 1 is uniformly charged by a first charger 2-1 as a corona charger or a scorotron charger and irradiated with a first exposure laser beam L-1 modulated in accordance with the first color image information (e.g., yellow image data) ahead of the charger 2-1 in the sub-scanning direction. The first electrostatic latent image is formed on the surface of the photosensitive layer by exposure. After this, a first developing unit 4-1 storing a liquid developer of first color (e.g., yellow) develops the electrostatic latent image formed by the first exposure laser beam L-1. A visible image of first color is formed by the liquid developer or toner attracted to the electrostatic latent image.

The visible image of first color by the liquid developer or toner attracted to the electrostatic latent image may be transferred to recording paper 9 by a transfer unit 5. In this example, the next exposure/development process is performed. More specifically, the photosensitive drum 1 is uniformly charged by a second charger 2—2. The second electrostatic latent image is formed at the same position as that of the first electrostatic latent image by a second exposure laser beam L-2 modulated in accordance with the second color image information (e.g., magenta image data). The electrostatic latent image is developed by a second developing unit 4-2 storing a liquid developer of second color (e.g., magenta), which is different from the liquid developer stored in the first developing unit 4-1, to form a visible image of second color. After this development, the visible image of first color and that of second color are formed on the photosensitive drum 1 in a registration.

A third charger 2-3 uniformly charges the photosensitive drum, the third electrostatic latent image is formed by a third exposure laser beam L-3 modulated in accordance with the third color image information (e.g., cyan image data), and a visible image of third color (e.g., cyan) is formed by a third developing unit 4-3. Finally, a fourth charger 2-4 uniformly charges the photosensitive drum, the fourth electrostatic latent image is formed by a fourth exposure laser beam L-4 modulated in accordance with the fourth color image information (e.g., black image data), and a visible image of fourth color (e.g., black) is formed by a fourth developing unit 4—4.

In this way, the visible images of four colors, e.g., yellow (Y), magenta (M), cyan (C), and black (K) are registered on the photosensitive drum 1 to form a full-color image. The color image on the photosensitive drum 1 is transferred to the recording paper 9 by the transfer unit 5. The color image on the photosensitive drum 1 may be directly transferred to the recording paper 9. In this example, the color image is transferred to the recording paper 9 via an intermediate transfer medium 6.

To transfer the color image from the photosensitive drum 1 to the intermediate transfer medium 6 and then from the intermediate transfer medium 6 to the recording paper 9, transfer using an electric field or transfer using pressure (and heat) can be used. Generally, many liquid developers can be fixed to the recording paper at room temperature. The liquid developers may be thermally fixed by heating, e.g., a press roller 7, as shown in FIG. 1.

The above-described color image formation process is disclosed in, e.g., U.S. Pat. No. 5,570,173.

The exposure laser beams L-1 to L-4 for forming electrostatic latent images are deflected by a polygon mirror 10 rotated by a polygon motor 11 at a high speed and scans the surface of the photosensitive drum 1 in a direction (main scanning direction) perpendicular to the rotational direction of the photosensitive drum 1. The exposure laser beams L-1 to L-4 are emitted by independent semiconductor lasers (not shown), deflected by the same surface of the polygon mirror 10, transmitted through f-θ lenses 12 and 13, and distributed to predetermined positions on the surface of the photosensitive drum 1 by deflection mirrors 20-1 to 20-8.

The f-θ lenses 12 and 13 are used to focus the laser beams L-1 to L-4 into about 0.6-mm-diameter spots on the surface of the photosensitive drum 1 and obtain a predetermined scanning speed in the axial direction of the photosensitive drum 1 in scanning the surface of the photosensitive drum 1.

In scanning, the laser beams L-1 to L-4 are modulated (ON/OFF-controlled) in accordance with the image information of the respective colors to form electrostatic latent images on the photosensitive drum 1.

The arrangement of the scanning system formed from the exposure laser beams L-1 to L-4 will be described next in more detail with reference to FIG. 2. For the descriptive convenience, the deflection mirrors 20-1 to 20-8 for distributing the laser beams L-1 to L-4 on the photosensitive drum 1 are not illustrated in FIG. 2.

In the first embodiment, diffused light from four semiconductor lasers 21-1 to 21-4 are almost collimated by collimator lenses 23-1 to 23-4, respectively. The four exposure laser beams L-1 to L-4 are focused to almost the same position by half mirrors 24-1 to 24-4, respectively, and transmitted through a cylindrical lens 25 to irradiate the same deflection surface of the polygon mirror 10, thus forming the scanning system. The exposure laser beams L-1 to L-4 are simultaneously deflected by the deflection surface of the polygon mirror 10, sequentially transmitted through the f-θ lenses 12 and 13, and distributed to predetermined positions on the photosensitive drum 1 at predetermined incident angles by the deflection mirrors (not shown).

In this case, the exposure laser beams L-1 to L-4 deflected by the deflection surface of the polygon mirror 10 are guided to a photodetector 46 by a deflection mirror 47 via the f-θ lenses 12 and 13, so the scanning start timings of the laser beams L-1 to L-4 are detected. That is, the detection signal from the photodetector 46 is a scanning timing signal generated every scanning start timing of the laser beams L-1 to L-4.

Figure 3:
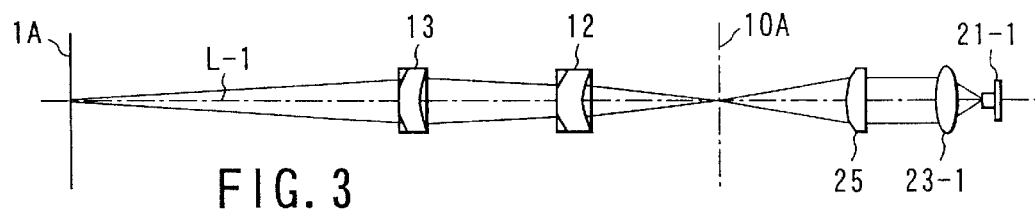
FIG. 3 is a view showing the layout of the optical system of the laser beam scanning unit according to the first embodiment.

FIG. 3 shows the layout of the optical system on the laser beam scanning plane.

A light beam from the semiconductor laser 21-1 is collimated by the collimator lens 23-1 and focused only in the direction (sub-scanning direction) perpendicular to the main scanning direction by the cylindrical lens 25 to form an image on a polygon mirror deflection surface 10A. The laser beam deflected by the polygon mirror deflection surface 10A forms an image on a photosensitive drum surface 1A conjugate to the polygon mirror deflection surface 10A because of the optical characteristics of the f-θ lenses 12 and 13.

This arrangement suppresses a variation in beam position on the photosensitive drum surface 1A due to the surface tilt of the polygon mirror deflection surface 10A. With this arrangement, even when the surface accuracy of the polygon mirror deflection surface 10A is not extremely high, the output image has no gradation variation called banding due to the change in beam image formation position on the photosensitive drum 1 in units of surfaces of the polygon mirror 10.

An arrangement for correcting the sub-scanning relative positions of the electrostatic latent images of single-color images to reduce the registration errors of the color images on the photosensitive drum 1, and particularly, a shift in the relative position between the single-color images in the rotational direction (sub-scanning direction) of the photosensitive drum 1 will be described with reference to FIG. 4.

In the color image forming apparatus of this embodiment, a color image is formed by registering single-color images of different colors, which are obtained by developing the electrostatic latent images formed by the exposure laser beams L-1 to L-4 into visible images. When the image formation positions of the laser beams L-1 to L-4 shift on the photosensitive drum 1, the relative positions between the electrostatic latent images of the single-color images shift. Accordingly, an image registration error is generated when the single-color images are registered, resulting in large degradation in image quality.

Figure 4:
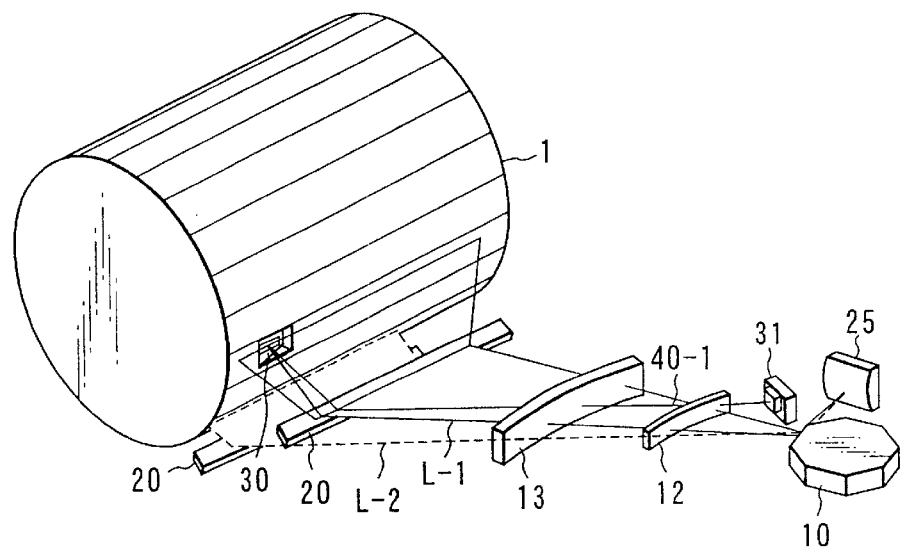
FIG. 4 is a perspective view showing the arrangement of main part of the color image forming apparatus according to the first embodiment.

In this embodiment, to reduce this image registration error and, more particularly, the error in the sub-scanning direction, a light reflection surface 30 for reflecting a laser beam is provided on the surface of the photosensitive drum 1, as shown in FIG. 4. Light reflected by the light reflection surface 30 is detected by a photodetector 31. The detection signal output from the photodetector 31 is input to a control circuit (to be described later) to control the exposure timings (image formation timings) of the exposure laser beams L-1 to L-4. With this arrangement, the positions of electrostatic latent images formed by the laser beams L-1 to L-4, i.e., the single-color image formation positions are controlled relative to each other.

For the descriptive convenience, only two beams L-1 and L-2 out of the four exposure laser beams L-1 to L-4, and only one reflected light beam 40-1 out of reflected light beams 40-1 to 40-4 of the laser beams L-1 to L-4 from the light reflection surface 30 on the photosensitive drum 1 are illustrated in FIG. 4. The deflection mechanism of the laser beams L-1 to L-4 is simplified.

When the exposure laser beams L-1 to L-4 deflected by the polygon mirror 10 scan the surface of the photosensitive drum 1, the reflected light beams 40-1 to 40-4 are generated from the laser beams L-1 to L-4 passing on the light reflection surface 30. The light reflection surface 30 is formed on the surface of the photosensitive drum 1 and therefore moves relative to the laser beams L-1 to L-4 as the photosensitive drum 1 rotates. The reflected light beams 40-1 to 40-4 are detected by the photodetector 31 when the light reflection surface 30 moves to the scanning positions of the laser beams L-1 to L-4. The exposure timings of the laser beams L-1 to L-4 are determined in accordance with the detection signals from the photodetector 31.

With this arrangement, the electrostatic latent images, i.e., the single-color images formed on the photosensitive drum 1 by the laser beams L-1 to L-4 are formed at positions relative to the light reflection surface 30. Hence, even when the distribution positions of the laser beams L-1 to L-4 on the photosensitive drum 1 have a shift, the single-color image formation positions with respect to the photosensitive drum 1 match, and any image registration error in the color image formed on the photosensitive drum 1 can be prevented.

The photodetector 31 is located at a position separated from the surface of the photosensitive drum 1 by the same distance as that between the surface of the photosensitive drum 1 and the polygon mirror 10, where the reflected light beams 40-1 to 40-4 have passed through the f-θ lenses 13 and 12. As has been described with reference to FIG. 3, the optical system is constructed such that a laser beam is focused by the deflection surface 10A of the polygon mirror 10 in the direction perpendicular to the main scanning direction. When the photodetector 31 is set at the above position, the reflected, light beams 40-1 to 40-4 diffused when they are reflected by the light reflection surface 30 on the photosensitive drum 1 are focused onto the photodetector 31 through the f-θ lenses 13 and 12. For this reason, the light-receiving amount per unit area of the photodetector 31 increases, and the detection sensitivity can be made high.

The light-receiving surface of the photodetector 31 is almost conjugate to the surface of the photosensitive drum 1. Hence, even when the angle of exit of reflected light from the light reflection surface 30 varies, the reflected light image formation position on the light-receiving surface of the photodetector 31 does not vary. More specifically, even when the incident angles of the laser beams L-1 to L-4 have errors with respect to predetermined values because of, e.g., attachment errors of deflection mirrors 20 which distribute the laser beams L-1 to L-4 to predetermined positions in the circumferential direction of the photosensitive drum 1, the beam image formation position on the light-receiving surface of the photodetector 31 at a position optically conjugate to the exit angle of the reflected light from the light reflection surface 30 does not shift, so the reflected light can be detected.

Figure 5:
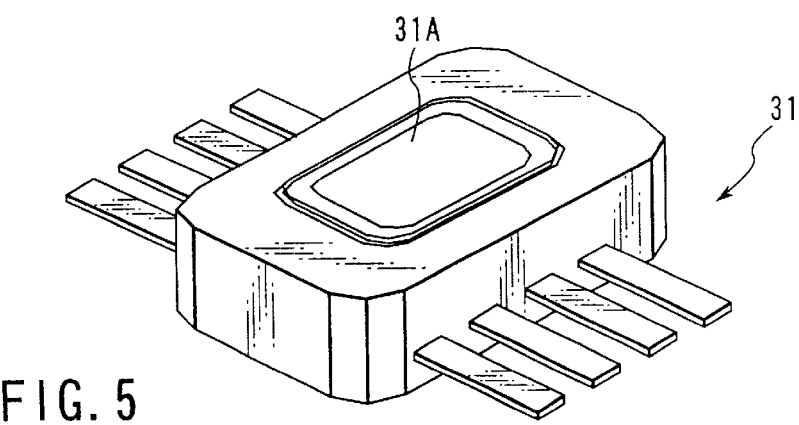
FIG. 5 is a perspective view showing the schematic arrangement of a photodetector.

FIG. 5 shows the arrangement of the photodetector 31. The photodetector 31 is formed from, e.g., a silicon photodiode and generates an electrical signal in correspondence with light incident on a light-receiving surface 31A. The four exposure laser beams L-1 to L-4 may be distributed to different positions on the deflection surface of the polygon mirror 10 in the direction perpendicular to the main scanning direction. For this reason, the light-receiving surface 31A preferably has a width with which the reflected light beams of all the laser beams L-1 to L-4 from the light reflection surface 30 can be detected.

The structure of the light reflection surface 30 will be described with reference to FIGS. 6A to 7B.

As shown in FIGS. 6A and 6B, the light reflection surface 30 has a predetermined angle with respect to the surface of the photosensitive drum 1 such that the reflected light beams 40-1 to 40-4 can be incident on the light-receiving surface of the photodetector 31 located at almost the same position as that of the deflection surface of the polygon mirror 10. More specifically, a trench portion 32 having a bottom surface tilted along the axial direction of the photosensitive drum 1 is formed in the bare portion of the photosensitive drum 1. Light is reflected by the bottom surface. A transparent cover member 33 formed from, e.g., an acrylic material is buried in the trench portion 32 as needed to prevent the reflectance from lowering due to dirt by foreign substances such as a developer.

FIG. 7A shows the structure of the light reflection surface 30 in more detail. A high-reflection sheet formed from a deposited film of, e.g., silver or aluminum is bonded, with an adhesive, to the bottom surface of the trench portion 32, which is tilted in the axial direction of the photosensitive drum 1, thereby forming a reflection portion 34. The reflection portion 34 has a long strip shape with a size corresponding to 20 dots in a main scanning direction X of the laser beam L-1, i.e., the axial direction of the photosensitive drum 1, and 2 dots in the direction perpendicular to the main scanning direction, i.e., a rotational direction (sub-scanning direction) Y of the photosensitive drum 1. In this embodiment, the reflection portion 34 has a shape with a size corresponding to 0.84×0.08 mm where the resolution of an output image is 600 dpi. With this shape, only when the laser beam scanning position matches the position of the reflection portion 34, the reflected light beams 40-1 to 40-4 (reflected light beams 40-2 to 40-4 are not illustrated) are generated.

The reflection portion 34 has a strip shape to prevent the light reflected by the reflection portion 34 from being impeded by dirt on the surface of the photosensitive drum 1. In addition, when the reflection portion 34 is long in the main scanning direction of the laser beam L-1 to some degree, the reflected light beams 40-1 to 40-4 can be incident on the light-receiving surface 31A of the photodetector 31 as the laser beam L-1 scans even when the attaching accuracy of the photodetector 31 is relatively low.

The reflection portion 34 has a width corresponding to 2 dots in the sub-scanning direction Y to set the width smaller than the allowable image registration error value. The allowable image registration error value in forming a color image is appropriately about 0.1 mm or less, though it depends on the type of image to be output. The color image forming apparatus of this embodiment assumes 600 dpi (pixel size: 0.042 mm) as the resolution of an output image. An allowable image registration error value of 0.1 mm corresponds to 2.4 dots. Hence, the width (2 dots) of the reflection portion 34 in the sub-scanning direction Y is smaller than the allowable error value.

The sub-scanning width of the reflection portion 34 is larger than 1 dot because the laser beam scanning interval is 1 dot. When the width is smaller than 1 dot, the laser beam may not irradiate the reflection portion 34.

To set the width of the reflection portion 34 to be smaller than the allowable image registration error value is effective in simplifying a circuit for processing the detection signal output from the photodetector 31. However, when a threshold value for the detection signal is set in this processing circuit, and the timing (edge timing) when the leading-edge level of the detection signal exceeds the threshold value is detected, the width of the reflection portion 34 need not be set to be smaller than the allowable registration error value, so the reflection portion 34 can have a larger size.

An arrangement for improving the image registration accuracy by controlling the image formation timing in accordance with the detection signal from the photodetector 31 will be described with reference to FIG. 8.

Figure 8:
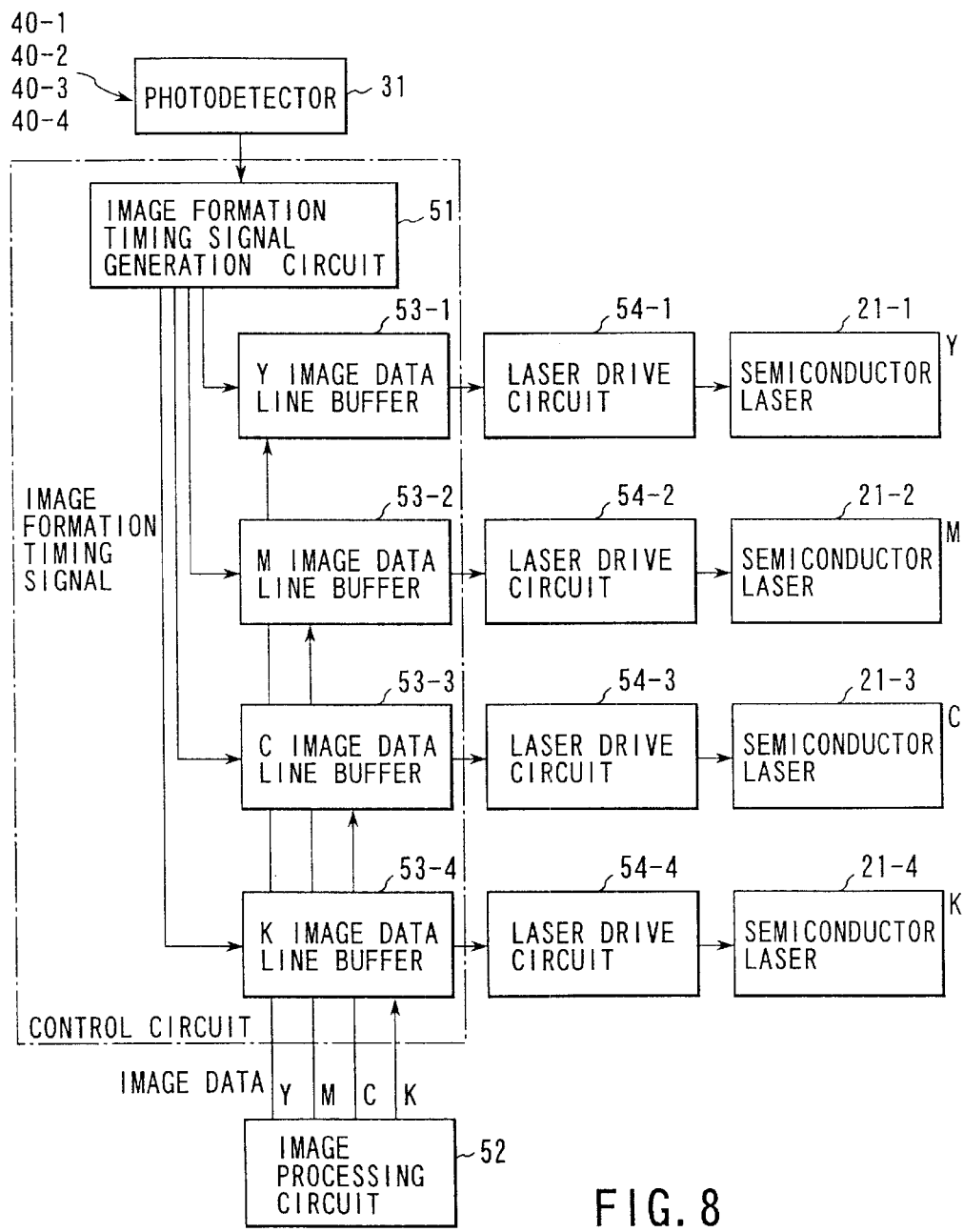
FIG. 8 is a block diagram showing the arrangement of a control circuit having a function of determining the image formation timing on the basis of the detection signal from the photodetector of the first embodiment.
Figure 9:
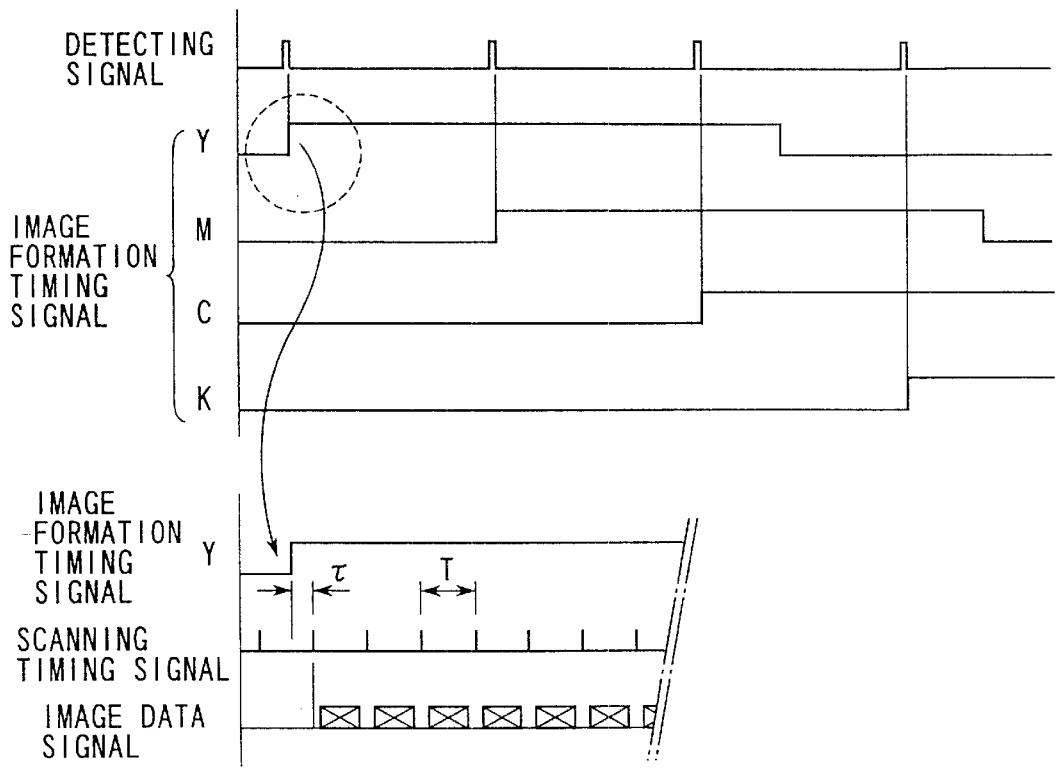
FIG. 9 is a timing chart for explaining the operation of the control circuit of the first embodiment.

FIG. 8 is a block diagram showing the arrangement of a control circuit having a function of determining the image formation timing on the basis of the detection signal from the photodetector 31. FIG. 9 is a timing chart showing the operation of the circuit.

As described above, the photodetector 31 detects the reflected light beams 40-1 to 40-4 from the light reflection surface 30 (not shown in FIG. 8) formed on the surface of the photosensitive drum 1 and outputs a detection signal. This detection signal is periodically generated at the same interval as the time when the photosensitive drum 1 relatively moves between the four exposure laser beams L-1 to L-4 distributed on the photosensitive drum 1, as shown on the upper side of FIG. 9. An image formation timing generation circuit 51 sequentially generates image formation timing signals (electrostatic latent image write start timing signals) for forming the single-color images of Y, M, C, and K in synchronism with the detection signal.

An image processing circuit 52 decomposes the image data of a color image to be output to singlecolor image data of Y, M, C, and K. Image data corresponding to several scanning cycles of the exposure laser beams L-1 to L-4 are stored in line buffers 53-1 to 53-4, respectively. In synchronism with the image formation timing signal, the single-color image data signals are transferred from the line buffers 53-1 to 53-4 to laser drive circuits 54-1 to 54-4, respectively. The semiconductor lasers 21-1 to 21-4 are driven by the laser drive circuits 54-1 to 54-4 to output the exposure laser beams L-1 to L-4 ON/OFF-controlled (modulated) in accordance with the single-color image data signals, thereby forming electrostatic latent images on the photosensitive drum 1.

The image formation timing signal for forming a Y image is enlarged on the lower side of FIG. 9. A scanning timing signal representing the timing at which the laser drive circuit 54-1 drives the semiconductor laser 21-1, and an image data signal are also shown. In this example, a time delay τ is generated between the leading edge of the image formation timing signal and the generation timing of the scanning timing signal immediately thereafter. This time delay τ equals a scanning period T of the laser beam at maximum. This time corresponds to 0.042 mm or less on the photosensitive drum 1. Since this value is sufficiently smaller than the allowable image registration error value, 0.1 mm, no problem is posed.

In this way, the light reflected by the light reflection surface 30 is detected by the photodetector 31, and the semiconductor lasers 21-1 to 21-4 are driven in synchronism with the detection signal from the photodetector 31. The electrostatic latent images, i.e., the single-color images of Y, M, C, and K by the exposure laser beams L-1 to L-4 are formed on the photosensitive drum 1 at the same position using the light reflection surface 30 as a reference. Hence, the color image formed by registering the single-color images rarely has an image registration error, and a high-quality color image can be output.

Figure 10:
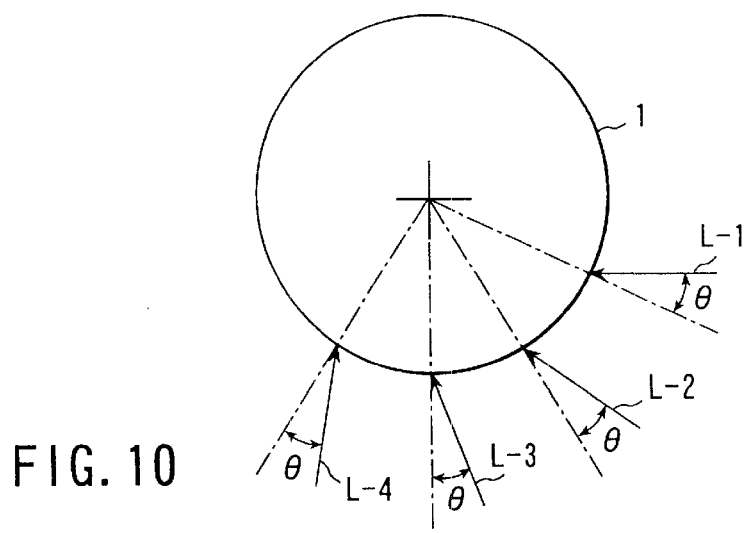
FIG. 10 is a view for explaining the laser beam incident angle on a photosensitive drum in the first embodiment.

In the first embodiment, the reflected light beams of the four exposure laser beams L-1 to L-4 from the single light reflection surface 30 are detected by the single photodetector 31. For this reason, the laser beams L-1 to L-4 are incident on the photosensitive drum 1 at the same incident angle θ, as shown in FIG. 10. This also applies to the second and third embodiments to be described later.

The incident angle θ is not 0° because the incident laser beams must not interfere with the reflected light from the photosensitive surface of the photosensitive drum 1. In this embodiment, setting is done such that the reflected light beams of the laser beams L-1 to L-4 from the light reflection surface 30 pass through the optical effective area of the f-θ lenses 13 and 12 and form images on the same photodetector 31. This also applies to the second embodiment to be described later.

When the four exposure laser beams L-1 to L-4 are slightly shifted in the direction perpendicular to the main scanning direction on the deflection surface of the polygon mirror 10 or the passage surfaces of the f-θ lenses, the image of the laser beams L-1 to L-4 reflected by the light reflection surface 30 can be formed on the same photodetector 31 by setting the incident angles of the laser beams L-1 to L-4 on the photosensitive drum 1 to be slightly different from each other.

The same reference numerals as in the first embodiment denote the same elements in the embodiments to be described below, and a detailed description thereof will be omitted.

(Second Embodiment)

Figure 11:
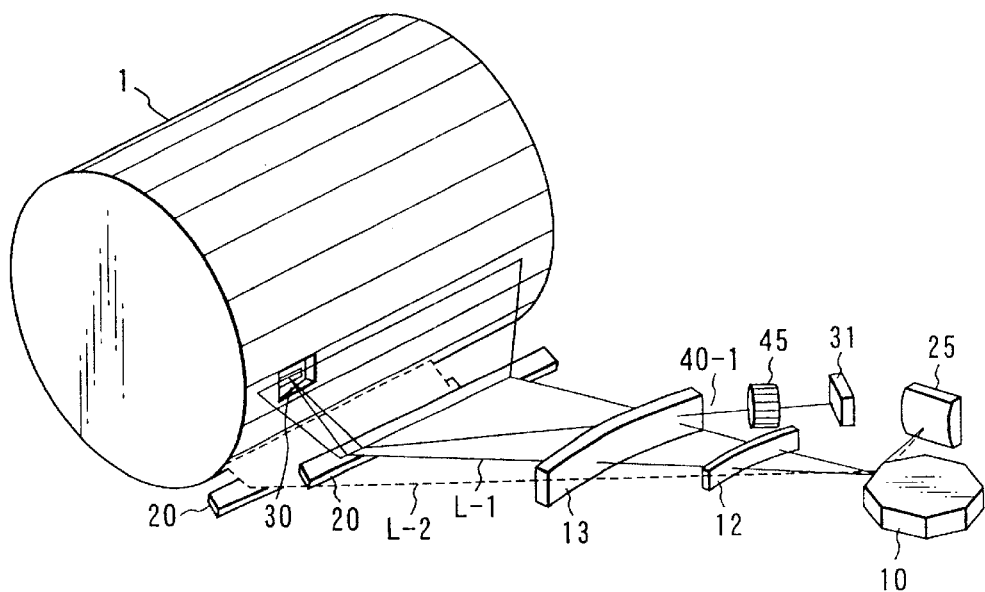
FIG. 11 is a perspective view showing the arrangement of main part of a color image forming apparatus according to the second embodiment of the present invention.

FIG. 11 is a view showing the arrangement of main part of a color image forming apparatus according to the second embodiment of the present invention.

For the descriptive convenience, only two beams L-1 and L-2 out of four exposure laser beams L-1 to L-4, and only one reflected light beam 40-1 out of reflected light beams 40-1 to 40-4 of the laser beams L-1 to L-4 from a light reflection surface 30 on a photosensitive drum 1 are illustrated in FIG. 11. The deflection mechanism of the laser beams L-1 to L-4 is simplified.

The second embodiment is different from the first embodiment in that a photodetector 31 is located at a position where the reflected light beam 40-1 from the light reflection surface 30 on the photosensitive drum 1 has passed through an f-θ lens 13 but the light beam does not pass through an f-θ lens 12.

The exposure laser beams L-1 to L-4 pass through the f-θ lens 13 at almost the same position in a direction perpendicular to the main scanning direction. For this reason, the reflected light beams 40-1 to 40-4 of the laser beams L-1 to L-4 from the light reflection surface 30 on the exposure laser beams L-1 to L-4 return to almost the same position. However, the reflected light beams 40-1 to 40-4 that have just passed through the f-θ lens 13 are not focused on the light-receiving surface of the photodetector 31. The reflected light beams are in a defocus state. As a solution to this, a condenser lens 45 is inserted between the f-θ lens 13 and the photodetector 31 to focus the reflected light beams 40-1 to 40-4 on the light-receiving surface of the photodetector 31, thereby increasing the detection sensitivity of the photodetector 31.

The detection signal from the photodetector 31 is supplied to a control circuit as shown in FIG. 8, as in the first embodiment, and used to control the image formation timing, i.e., control the positions of electrostatic latent images formed by the exposure laser beams L-1 to L-4 (single-color image formation positions).

In the second embodiment, the reflection portion of the light reflection surface 30 need not have a small size, unlike the first embodiment. The reflection portion can have an area of several ten to several hundred dots. This also applies to the third embodiment to be described later.

In the second embodiment, the positions of the light-receiving surfaces of the light reflection surface 30 and photodetector 31 are not optically conjugate. For this reason, the image formation position of the reflected light on the light-receiving surface of the photodetector 31 changes depending on the tilt of the light reflection surface 30. When the tilt of the light reflection surface 30 changes in accordance with the rotation angle of the photosensitive drum 1, the reflected light is incident on the light-receiving surface of the photodetector 31 to generate a detection signal only when the tilt of the light reflection surface 30 has a specific value.

Hence, when the image formation timings for the single-color images are determined in synchronism with the detection signal, as in the first embodiment, the single-color images can be formed using, as a reference, a specific tilt of the light reflection surface 30, i.e., a specific rotation angle position of the photosensitive drum 1, and the image registration error in the color image formed on the photosensitive drum 1 can be almost eliminated.

(Third Embodiment)

Figure 12:
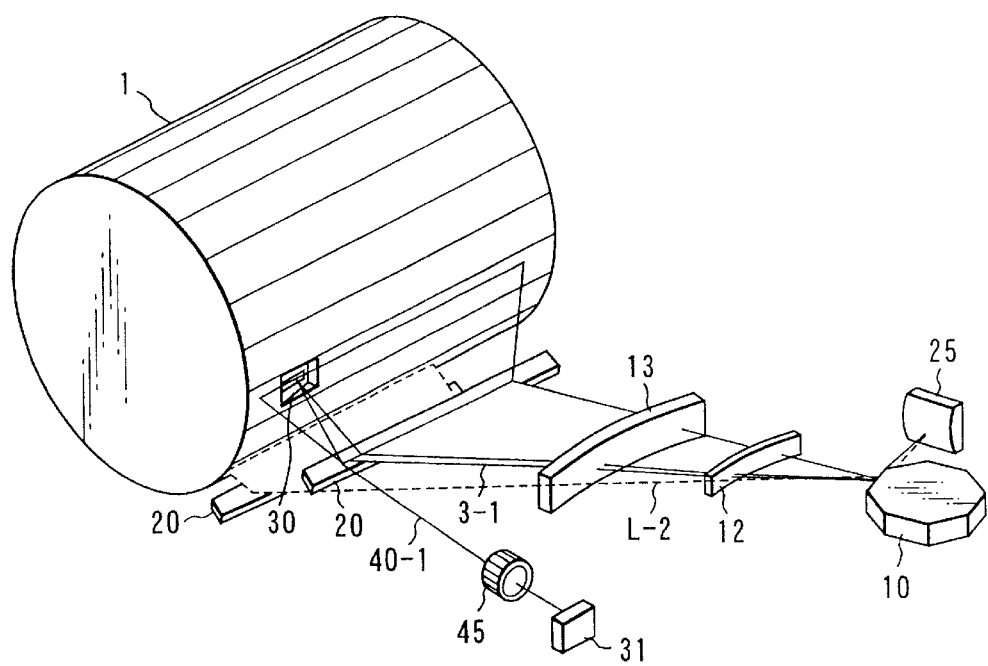
FIG. 12 is a perspective view showing the arrangement of main part of a color image forming apparatus according to the third embodiment of the present invention.

FIG. 12 is a view showing the arrangement of main part of a color image forming apparatus according to the third embodiment of the present invention.

In the third embodiment, a photodetector 31 is located at a position where reflected light beams 40-1 to 40-4 of exposure laser beams L-1 to L-4 (laser beams L-3 and L-4 are not shown) from a light reflection surface 30 do not pass through f-θ lenses 12 and 13. The four exposure laser beams L-1 to L-4 pass through the f-θ lens 13 at almost the same position in a direction perpendicular to the main scanning direction.

In this embodiment, the photodetector 31 is located at a position separated from the photosensitive surface of a photosensitive drum 1 by the same distance as that between the surface of the photosensitive drum 1 and the f-θ lens 13, where the reflected light beams 40-1 to 40-4 from the light reflection surface 30 do not pass through the f-θ lenses 12 and 13. With this arrangement., the reflected light beams 40-1 to 40-4 are detected by the single photodetector 31, as in the first and second embodiments.

Since the reflected light beams 40-1 to 40-4 are diffused light beams, the light beams are guided to the light-receiving surface of the photodetector 31 in a defocus state. Hence, as in the second embodiment, a condenser lens 45 is inserted in front of the light-receiving surface of the photodetector 31 to focus the reflected light beams 40-1 to 40-4 onto the light-receiving surface of the photodetector 31, thereby increasing the detection sensitivity of the photodetector 31.

The detection signal from the photodetector 31 is supplied to a control circuit as shown in FIG. 8, as in the first and second embodiments, and used to determine the single-color image formation timings.

(Fourth Embodiment)

Figure 13:
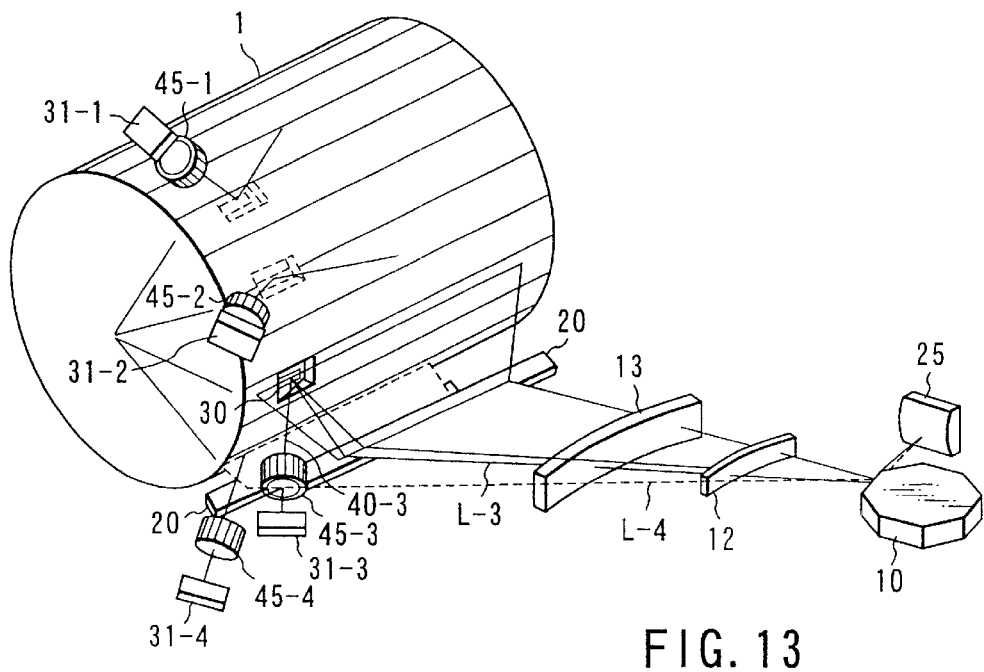
FIG. 13 is a perspective view showing the arrangement of main part of a color image forming apparatus according to the fourth embodiment of the present invention.

FIG. 13 is a view showing the arrangement of main part of a color image forming apparatus according to the fourth embodiment of the present invention.

In this embodiment, photodetectors 31-1 to 31-4 for individually detecting reflected light beams 40-1 to 40-4 of exposure laser beams L-1 to L-4 from a light reflection surface 30 on a photosensitive drum 1 are provided. The single-color image formation timings are determined in synchronism with the detection signals from the photodetectors 31-1 to 31-4, respectively.

Condenser lenses 45-1 to 45-4 are inserted to focus the reflected light beams 40-1 to 40-4 on the light-receiving surfaces of the photodetectors 31-1 to 31-4, thereby increasing the detection sensitivity. The photodetectors 31-1 to 31-4 are supported by photodetector holding members (not shown) to increase the attaching accuracy of the photodetectors 31-1 to 31-4 to a negligible level with respect to the allowable image registration error value of 0.1 mm.

Instead of increasing the attaching accuracy of the photodetectors 31-1 to 31-4, the delay times between the detection signals from the photodetectors 31-1 to 31-4 and the corresponding single-color image formation timings may be adjusted to minimize the image registration error in the output color image and increase the image registration accuracy.

(Fifth Embodiment)

Figure 14:
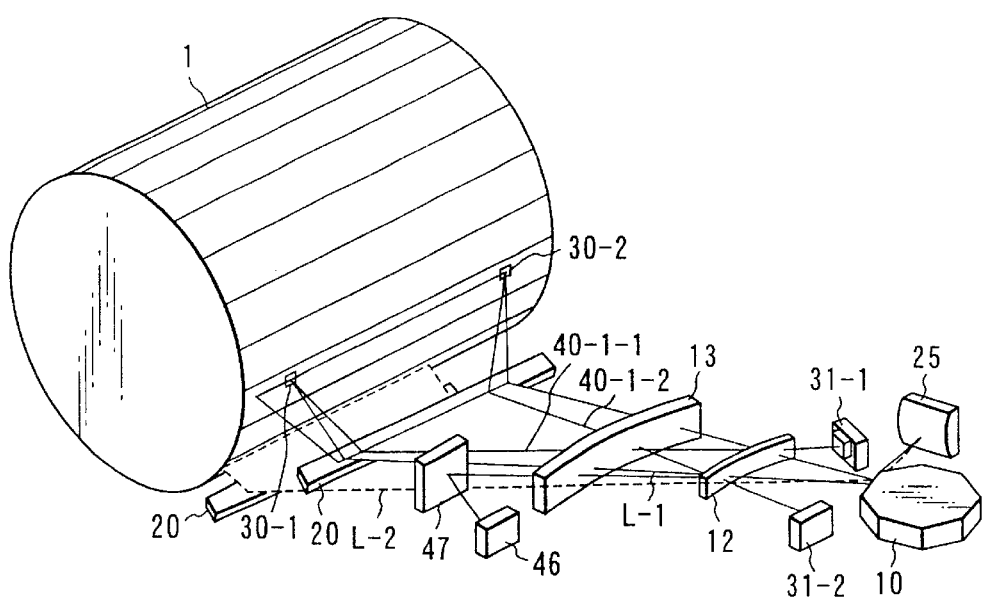
FIG. 14 is a perspective view showing the arrangement of main part of a color image forming apparatus according to the fifth embodiment of the present invention.

FIG. 14 is a view showing the arrangement of main part of a color image forming apparatus according to the fifth embodiment of the present invention.

The fifth embodiment has not only a function of correcting the relative positions of electrostatic latent images in the rotational direction (sub-scanning direction) of a photosensitive drum 1, as in the above-described embodiments, but also functions of correcting the relative image tilts of the electrostatic latent images, correcting the relative image magnifications of the electrostatic latent images, and correcting the relative positions of the electrostatic latent images in the main scanning direction of exposure laser beams L-1 to L-4.

In this embodiment, as shown in FIG. 14, light reflection surfaces 30-1 and 30-2 are formed on the photosensitive drum 1 at two ends (on the scanning start and end sides) in the main scanning direction. The reflection portion of each of the light reflection surfaces 30-1 and 30-2 has a square shape corresponding to 2×2 dots. Reflected light beams 40-1-1 and 40-1-2 from the light reflection surfaces 30-1 and 30-2 are detected by photodetectors 31-1 and 31-2, respectively.

Figure 15:
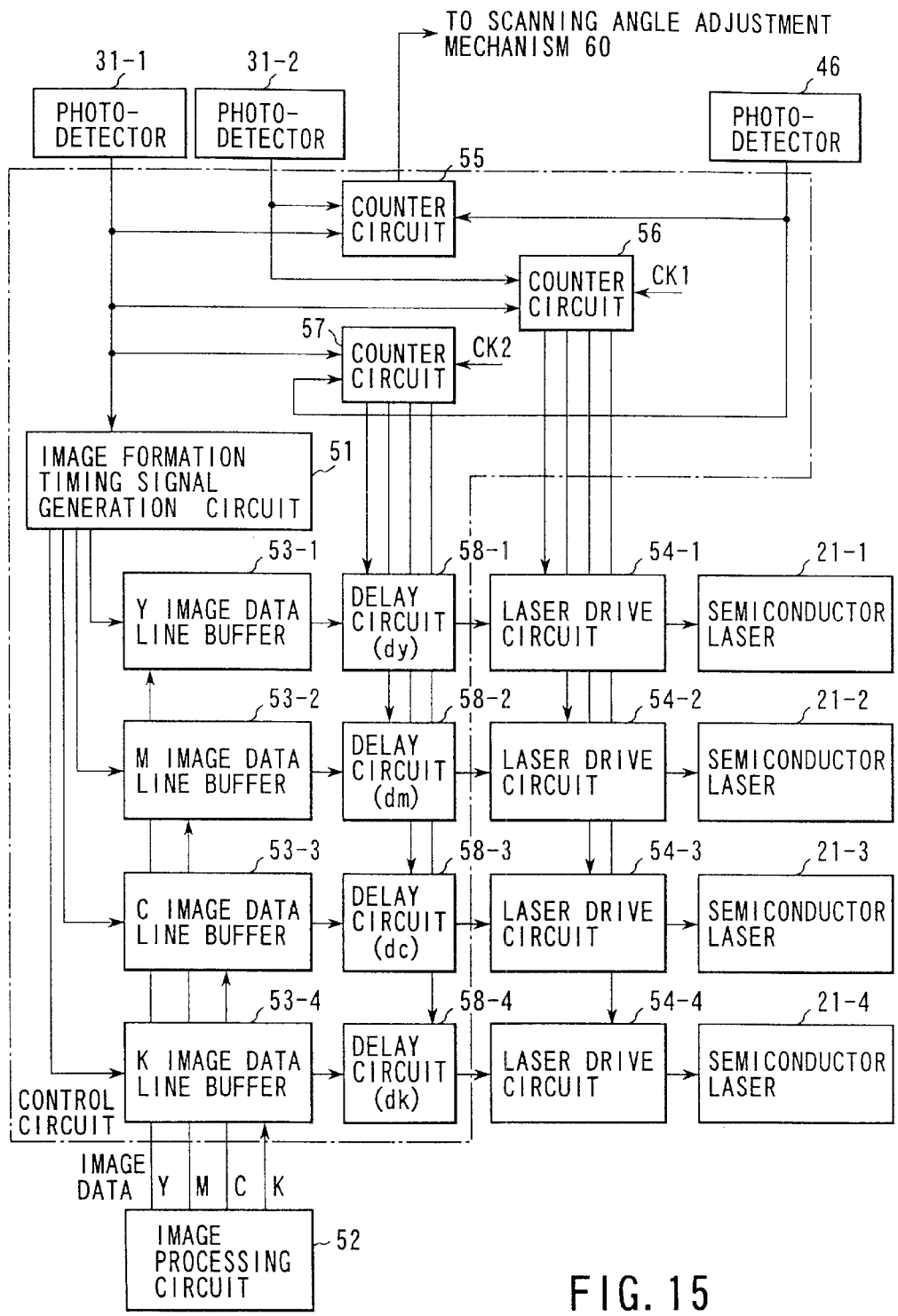
FIG. 15 is a block diagram showing the arrangement of a control circuit of the fifth embodiment.

FIG. 15 is a block diagram showing the arrangement of the control circuit of the fifth embodiment. Counter circuits 55, 56, and 57 and delay circuits 58-1 to 58-4 are added to the arrangement shown in FIG. 8 described in the first embodiment.

The counter circuit 55 receives the detection signals from the photodetectors 31-1 and 31-2 and the scanning timing signal from a photodetector 46 to detect the relative image tilts of electrostatic latent images due to the relative scanning angle difference between the exposure laser beams L-1 to L-4. The output from the counter circuit 55 is supplied to a scanning angle adjustment mechanism 60 to be described later.

The counter circuit 56 receives the detection signals from the photodetectors 31-1 and 31-2 and a clock signal CK1 to detect the relative image magnification errors of the electrostatic latent images formed by the exposure laser beams L-1 to L-4. The output from the counter circuit 56 is supplied to laser drive circuits 54-1 to 54-4 and used to control the modulation frequencies of the laser beams L-1 to L-4.

The counter circuit 57 receives the detection signal from the photodetector 31-1, the scanning timing signal from the photodetector 46, and a clock signal CK2 to detect the relative positions of the electrostatic latent images in the main scanning direction of the exposure laser beams L-1 to L-4. Outputs from the counter circuit 57 are supplied, as delay time control signals, to the delay circuits 58-1 to 58-4 inserted between line buffers 53-1 to 53-4 and the laser drive circuits 54-1 to 54-4, respectively.

The correction methods will be described below in detail.

[Correction of Relative Image Tilts]

Figure 16:
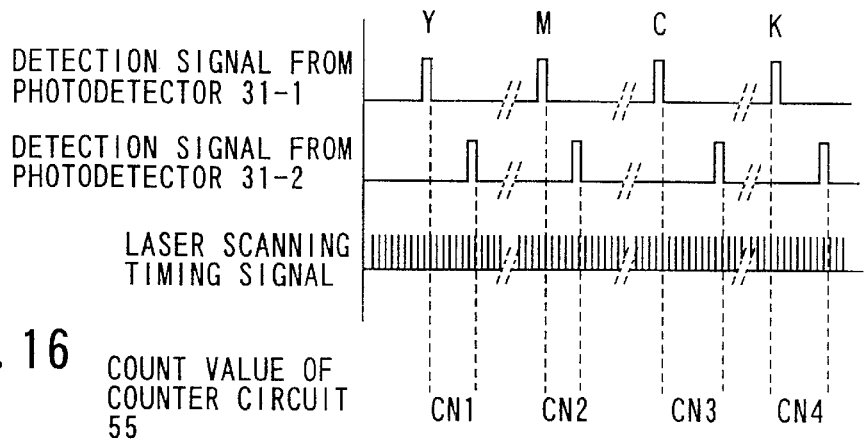
FIG. 16 is a timing chart for explaining a method of detecting a relative image tilt error in the fifth embodiment.

Detection and correction of the relative image tilts of electrostatic latent images will be described with reference to FIGS. 15 and 16.

Figure 2:
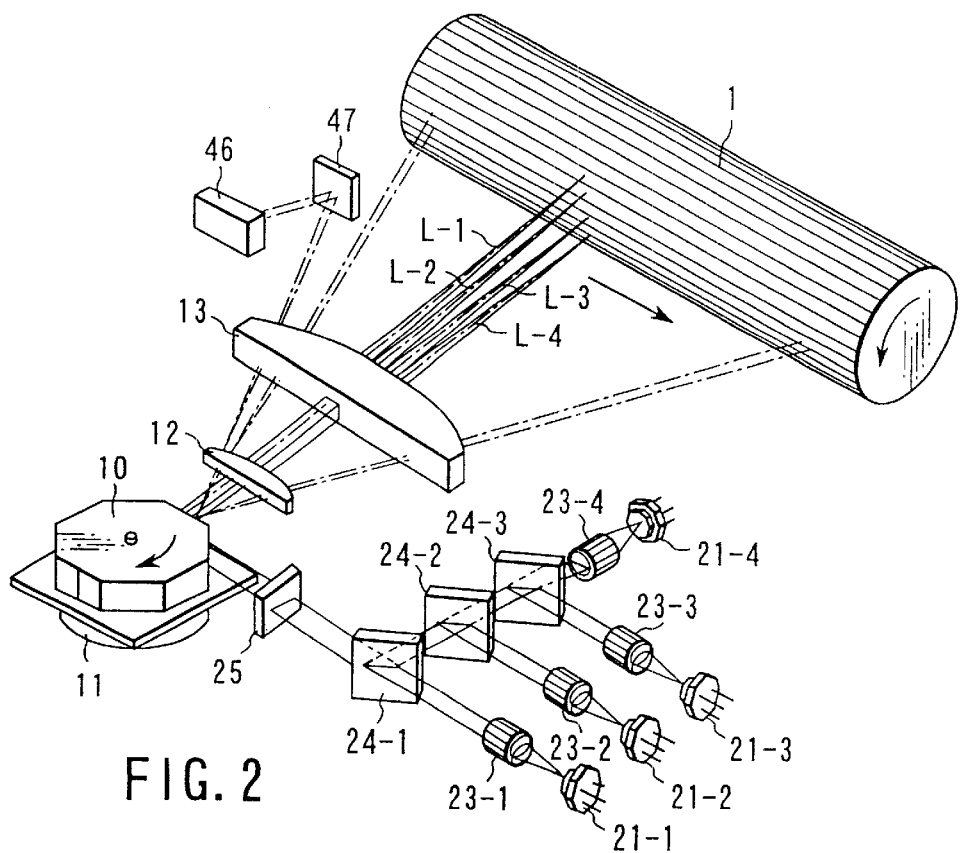
FIG. 2 is a view showing the arrangement of a laser beam scanning unit according to the first embodiment.

As described in the first embodiment with reference to FIG. 2, some components of the exposure laser beams L-1 to L-4 deflected by the deflection surface of a polygon mirror 10 are guided to the photodetector 46 by a deflection mirror 47 via f-θ lenses 12 and 13. As shown in FIG. 16, a scanning timing signal generated by the photodetector 46 every time the laser beams L-1 to L-4 start scanning is obtained as a detection signal. This scanning timing signal is supplied to the clock input of the counter circuit 55.

On the other hand, the reflected light beams 40-1-1 and 40-1-2 generated every time the exposure laser beams L-1 to L-4 irradiate the light reflection surfaces 30-1 and 30-2 are detected by the photodetectors 31-1 and 31-2, respectively. Two detection signals are obtained from the photodetectors 31-1 and 31-2, respectively, as shown in FIG. 16. The counter circuit 55 counts the scanning timing signal generated by the photodetector 46 between the edges of the detection signals from the photodetectors 31-1 and 31-2 to obtain count values CN1 to CN4.

The count values CN1 to CN4 represent the laser beam scanning counts between irradiation of the light reflection surface 30-1 by the exposure laser beams L-1 to L-4 and irradiation of the light reflection surface 30-2. The count values CN1 to CN4 exhibit the same value when the exposure laser beams L-1 to L-4 have the same scanning angle with respect to the photosensitive drum 1. When the scanning angles are different, the count values CN1 to CN4 also exhibit different values.

That is, the count values CN1 to CN4 represent the relative scanning angles of the exposure laser beams L-1 to L-4, i.e., the relative image tilts of electrostatic latent images, respectively. The relative image tilts of the electrostatic latent images can be eliminated by controlling the scanning angles of the exposure laser beams L-1 to L-4 such that the count values CN1 to CN4 have the same value.

In this embodiment, the deflection angles of deflection mirrors 20 are finely adjusted such that the count values CN1 to CN4 have the same value. More specifically, adjustment is done such that all the count values CN1 to CN4 become 0. With this arrangement, the scanning tilt of the exposure laser beams L-1 to L-4 with respect to the light reflection surfaces 30-1 and 30-2 can be suppressed within 1 dot. Hence, the relative image tilt amounts of the electrostatic latent images by the laser beams L-1 to L-4 can be suppressed within 1 dot.

Figure 17:
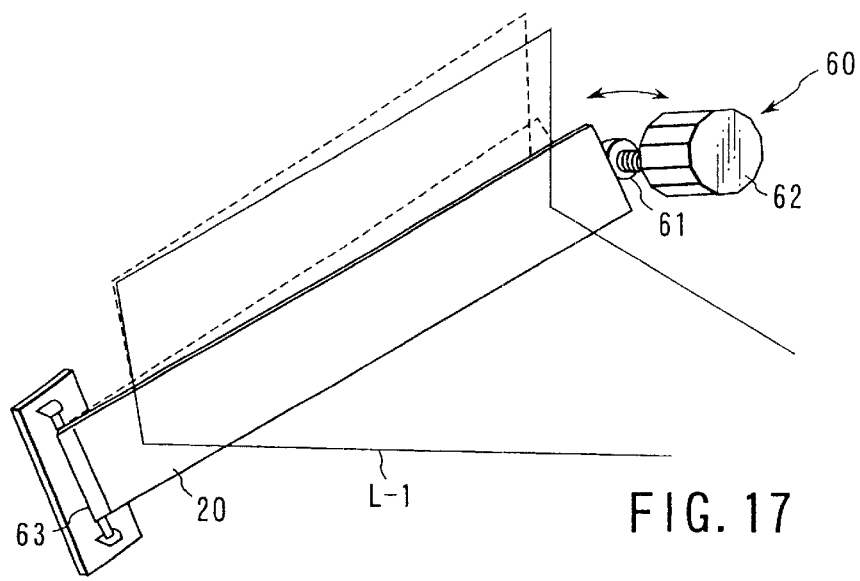
FIG. 17 is a schematic view of a scanning angle adjustment mechanism according to the fifth embodiment.

FIG. 17 is a view showing an example of the scanning angle adjustment mechanism 60. The deflection mirror 20 is rotatably supported at its one end by a pivotal support portion 63. The scanning angle adjustment mechanism 60 comprising a feed screw 61 and a motor 62 for driving the feed screw 61 is set at the other end. When the motor 62 is rotated, the deflection mirror 20 is rotated about the pivotal support portion 63, and the scanning angle of the laser beam L-1 is adjusted. The deflection mirrors 20 corresponding to the laser beams L-1 to L-4 have identical scanning angle adjustment mechanisms.

[Correction of Relative Image Magnifications]

Figure 18:
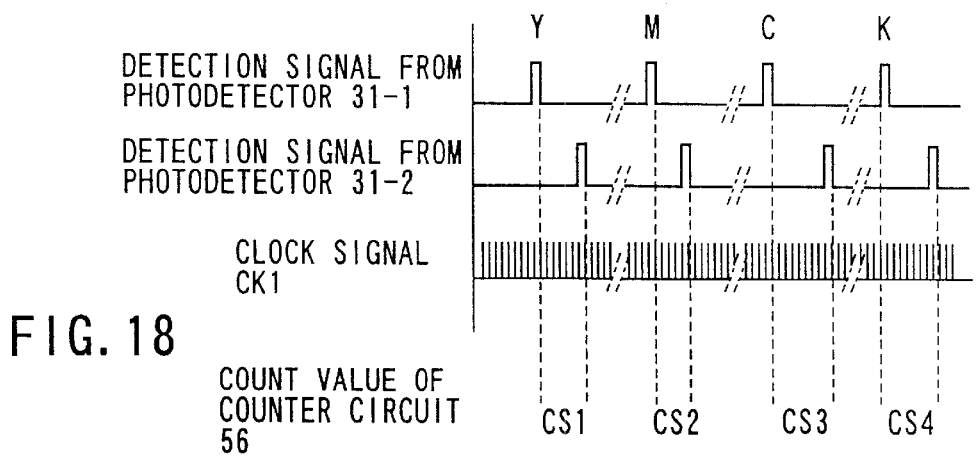
FIG. 18 is a timing chart for explaining a method of detecting a relative image magnification error in the fifth embodiment.

Correction of the relative image magnifications in the main scanning direction will be described next with reference to FIGS. 15 and 18.

As described above, the exposure laser beams L-1 to L-4 are deflected by the polygon mirror 10 and scan the surface of the photosensitive drum 1. When the optical path lengths from the deflection surface of the polygon mirror 10 to the surface of the photosensitive drum 1 are even slightly different, the scanning speeds on the photosensitive drum 1 are also different. When the four laser beams L-1 to L-4 have different optical path lengths, the laser beams L-1 to L-4 have different main scanning image magnifications in units of electrostatic latent images (this is called a relative image magnification error). This generates registration errors of the single-color images of the color image. For example, when the optical path lengths are different by 0.1%, and the laser beam scanning width corresponds to A4 portrait, a relative image magnification error of 0.297 mm 297 mm×0.001 is generated.

In the apparatus arrangement, the optical path lengths of the laser beams L-1 to L-4 are determined by the attaching angles of the deflection mirrors for the laser beams or the assembly distances between the deflection mirrors and the photosensitive drum 1. To suppress the optical path length within the allowable image registration error value, a high assembly accuracy is required, and it can hardly be realized.

In this embodiment, the relative image magnification error is detected by the following method, and the modulation frequencies of the exposure laser beams L-1 to L-4 are controlled on the basis of the relative image magnification error, thereby correcting the relative image magnifications of the electrostatic latent images to equal each other.

The reflected light beams 40-1-1 and 40-1-2 generated every time the exposure laser beams L-1 to L-4 irradiate the light reflection surfaces 30-1 and 30-2 are detected by the photodetectors 31-1 and 31-2, respectively. Two detection signals are obtained from the photodetectors 31-1 and 31-2, respectively, as shown in FIG. 18.

The counter circuit 56 counts the clock signal CK1 generated between the edges of the detection signals from the photodetectors 31-1 and 31-2. The time intervals between the edges are measured as count values CS1 to CS4. The count values CS1 to CS4 correspond to the times when the laser beams L-1 to L-4 pass between the light reflection surfaces 30-1 and 30-2. When the electrostatic latent images have the same relative image magnification, the count values CS1 to CS4 exhibit the same value. When the relative image magnifications are different, the count values CS1 to CS4 also exhibit different values.

When the frequencies (modulation frequencies) of drive clocks for modulating the exposure laser beams L-1 to L-4 in accordance with image information are selected in semiconductor lasers 21-1 to 21-4 in accordance with the measured time intervals (count values CS1 to CS4), the relative image magnifications of the electrostatic latent images can be made equal. More specifically, the laser drive circuits 54-1 to 54-4 shown in FIG. 15 have a plurality of clock signal sources with frequencies that are changed in units of 0.01%. Appropriate clock signal sources are selected on the basis of the count values CS1 to CS4 of the counter circuit 56, and clocks from the selected clock signal sources are used as driving clocks.

With this arrangement, even when the exposure laser beams L-1 to L-4 have different scanning speeds, the lengths of the electrostatic latent images, i.e., the lengths of the single-color images in the main scanning direction can be made equal by setting the modulation frequencies of the exposure laser beams L-1 to L-4 from the semiconductor lasers 21-1 to 21-4 to be different from each other. Hence, the relative image magnification error in the color image obtained by registering the single-color images can be eliminated.

[Correction of Relative Image Position in Main Scanning Direction]

Correction of the relative positions of electrostatic latent images in the main scanning direction of the exposure laser beams L-1 to L-4 will be described next with reference to the timing charts shown in FIGS. 19 and 20.

When the image formation positions of the laser beams on the photosensitive drum 1 shift, the relative positions of electrostatic latent images corresponding to the single-color images shift. Due to this, an image registration error occurs when the single-color images are registered, resulting in large degradation in image quality, as described above.

Figure 19:
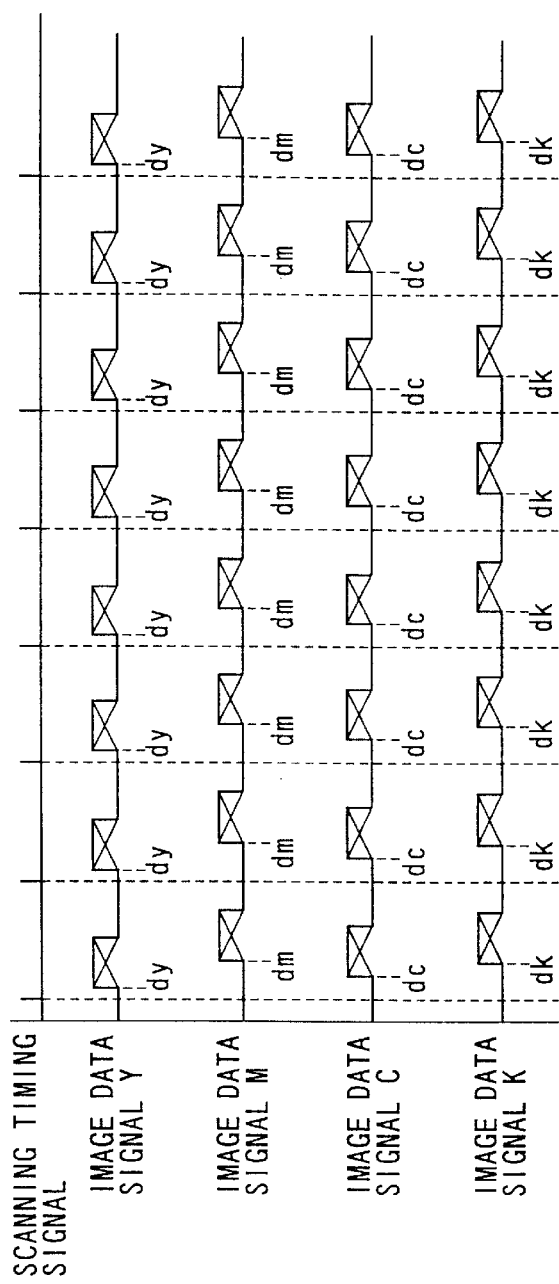
FIG. 19 is a timing chart for explaining a method of correcting relative image positions in the main scanning direction in the fifth embodiment.

In this embodiment, to reduce, particularly, the main-scanning shift of the image registration error, the Y, M, C, and K image data signals are delayed from the edge of the scanning timing signal generated every time the exposure laser beams L-1 to L-4 start scanning, by times dy, dm, dc, and dk corresponding to the relative image positional error in the main scanning direction, as shown in the timing chart of FIG. 19.

Figure 20:
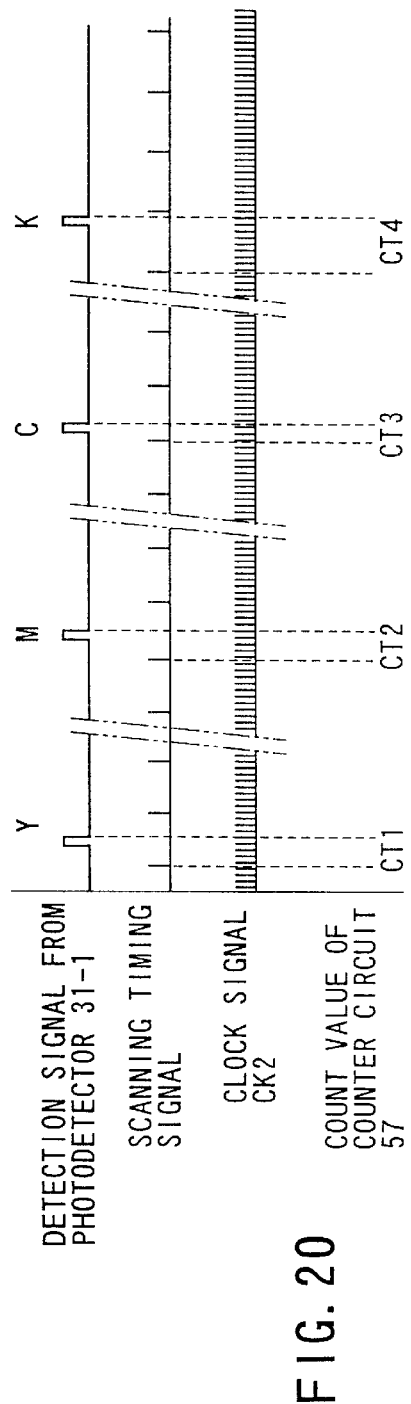
FIG. 20 is a timing chart for explaining a method of detecting a relative image positional error in the main scanning direction in the fifth embodiment.

More specifically, the counter circuit 57 counts the time intervals between the edges of detection signals from the photodetector 31-1 and the edges of scanning timing signals from the photodetector 46 shown in FIG. 20 as count values CT1 to CT4 of the clock signal CK2. The count values CT1 to CT4 are supplied to the delay circuits 58-1 to 58-4 as delay time control signals, respectively.

The count values CT1 to CT4 represent the times from the start of scanning to irradiation of the light reflection surface 30-1 by the exposure laser beams L-1 to L-4. When the electrostatic latent image formation timings in the main scanning direction are the same, the count values CT1 to CT4 exhibit the same value. When the electrostatic latent image formation timings are different, the count values CT1 to CT4 exhibit different values accordingly. That is, the count values CT1 to CT4 represent the main-scanning relative positional errors of the electrostatic latent images formed by the exposure laser beams L-1 to L-4.

When the delay times dy, dm, dc, and dk of the delay circuits 58-1 to 58-4 are controlled in accordance with the count values CT1 to CT4 from the counter circuit 57 to be inversely proportional to the count values CT1, CT2, CT3, and CT4, respectively, the electrostatic latent images are formed at the same position in the main scanning direction. Hence, the image registration error in the color image in the main scanning direction can be eliminated.

The relative position of the color image in the main scanning direction can also be corrected using an arrangement having one reflection surface 30 and one photodetector 31, as in the first embodiment. For the direction (sub-scanning direction) perpendicular to the main scanning direction, the image positions can be corrected by the scheme described in the first embodiment, and a detailed description thereof will be omitted.

According to the fifth embodiment, even when the laser beams L-1 to L-4 for forming electrostatic latent images of single-color images are translated from the distribution positions on the photosensitive drum 1 or have tilts in the main scanning direction or a scanning speed difference, any image registration error can be prevented by determining the electrostatic latent image formation positions of single-color images on the photosensitive drum 1 using, as a reference, the positions of the light reflection surfaces 30-1 and 30-2 at the two ends in the main scanning direction. Hence, a high-quality color image can be output.

(Sixth Embodiment)

FIGS. 21A and 21B are views showing the arrangement of main part of a color image forming apparatus according to the sixth embodiment of the present invention. FIGS. 21A and 21B especially show the structure of a light reflection surface 30.

In the first embodiment, the trench portion 32 is formed in the bare portion of the photosensitive drum 1, and the reflection portion 34 is formed on the bottom surface of the trench portion 32, which is tilted in the axial direction of the photosensitive drum 1, thereby forming the light reflection surface 30, as shown in FIGS. 6A to 7B.

In the sixth embodiment, as shown in FIGS. 21A and 21B, a tilt surface 71 tilted inward in the axial direction of a photosensitive drum 1 is formed on the outer surface of the photosensitive drum 1, and the light reflection surface 30 is formed at part of the tilt surface 71. The light reflection surface 30 is realized by, e.g., bonding a reflection member such as a high-reflection sheet to part of the tilt surface 71 with an adhesive.

In this case, when exposure laser beams L-1 to L-4 (laser beams L-3 and L-4 are not shown) are incident on the light reflection surface 30, reflected light beams 40-1 to 40-4 (laser beams 40-2, 40-3, and 40-4 are not shown) from the light reflection surface 30 are deflected inward in the axial direction of the photosensitive drum 1 because the light reflection surface 30 is formed on the tilt surface 71 tilted inward in the axial direction of the photosensitive drum 1. The reflected light beams are focused on a photodetector 31 via f-θ lenses 13 and 12, as in the first embodiment.

The structure of the light reflection surface 30 of this embodiment can also be combined with the second to fifth embodiments.

(Seventh Embodiment)

FIGS. 22A and 22B are views showing the arrangement of main part of a color image forming apparatus according to the seventh embodiment of the present invention.

In the sixth embodiment shown in FIGS. 21A and 21B, the light reflection surface 30 is formed on the tilt surface 71 formed along the outer surface of the photosensitive drum 1 while being tilted inward in the axial direction of the photosensitive drum 1. In the seventh embodiment, as shown in FIGS. 22A and 22B, a tilt surface 72 is formed along the outer surface of the photosensitive drum 1 while being tilted outward in the axial direction of the photosensitive drum 1, and a light reflection surface 30 is formed at part of the tilt surface 72. This light reflection surface 30 is also realized by, e.g., bonding a reflection member such as a high-reflection sheet formed from a deposited film of silver or aluminum to part of the tilt surface 71 with an adhesive.

In this case, when exposure laser beams L-1 to L-4 (laser beams L-3 and L-4 are not shown) are incident on the light reflection surface 30, reflected light beams 40-1 to 40-4 (laser beams 40-2, 40-3, and 40-4 are not shown) from the light reflection surface 30 are deflected outward in the axial direction of the photosensitive drum 1 because the light reflection surface 30 is formed on the tilt surface 72 tilted outward in the axial direction of the photosensitive drum 1. The reflected light beams are focused on a photodetector 31 via a condenser lens 45.

The structure of the light reflection surface 30 of this embodiment can also be combined with the third to fifth embodiments.

(Other Embodiments)

The present invention is not limited to the first to seventh embodiments, and various changes and modifications can be made.

In the first to seventh embodiments, the light reflection surface 30 (30-1 or 30-2) is formed in the bare portion of the photosensitive drum 1. Even when the light reflection surface is set on the outer surface of a flange member for supporting the bare portion of the photosensitive drum, the same effect as described above can be obtained.

In the first to seventh embodiments, the light reflection surface 30 is located at the scanning end portion on the photosensitive drum 1 outside the image area in the main scanning direction. This is because an image can be formed in any area on the surface of the photosensitive drum 1. When an electrostatic latent image is formed in an image formation area other than the light reflection surface setting area, the light reflection surface need not always be formed outside the image area. The light reflection surface may be formed in the image formation area.

One light reflection surface may have a plurality of reflection portions adjacent to each other. In this case, the pattern of a continuous detection signal from the photodetector in correspondence with reflected light from the plurality of reflection portions is determined. With this arrangement, even when the reflected light is partially omitted due to dirt on some reflection portions, the reflected light can be properly detected.

Two light reflection surfaces having different shapes may be formed in the rotational direction of the photosensitive drum. One of the light reflection surfaces may be formed into a flat surface while the other may be formed into a curved surface. Reflected light beams from the respective light reflection surfaces are detected by a photodetector. In this case, a reference position signal in the rotational direction of the photosensitive drum is generated. The number of scanning timing signals between the detection signal of the reflected light beam from the flat light reflection surface from the reference position signal and the detection signal of the reflected light beam from the curved light reflection surface from the reference position signal is counted. The relative positional errors of the laser beams can be detected from the count values.

In the first to seventh embodiments, an electrostatic latent image is formed using a laser beam as an exposure beam. However, especially the fourth embodiment is not limited to the laser scanning system. The present invention can also be applied to a color image forming apparatus for forming an electrostatic latent image using a light beam from a line head such as an LED head as an exposure beam.

In the first to seventh embodiments, a photodetecting element formed from a silicon photodiode is used as the photodetector. However, any other element having a photoelectric conversion function can be used.

In the first to seventh embodiments, a photosensitive drum is used as an electrostatic latent image carrier. However, the present invention can also be applied to a color image forming apparatus which uses a belt-shaped carrier and forms an image while moving the carrier.

According to the above-described first to seventh embodiments of the present invention, the image registration error in a color image can be accurately detected and corrected without wasting toner or requiring any accurate toner mark detector. Hence, a high-quality color image can be formed at a high speed with a simple arrangement, resulting in reduction of apparatus cost and running cost.

(Eighth Embodiment)

The eighth embodiment of the present invention will be described next.

In this embodiment, a modification of the reflection surface 30 (FIG. 4) of the above-described first embodiment will be described.

Figure 23A:
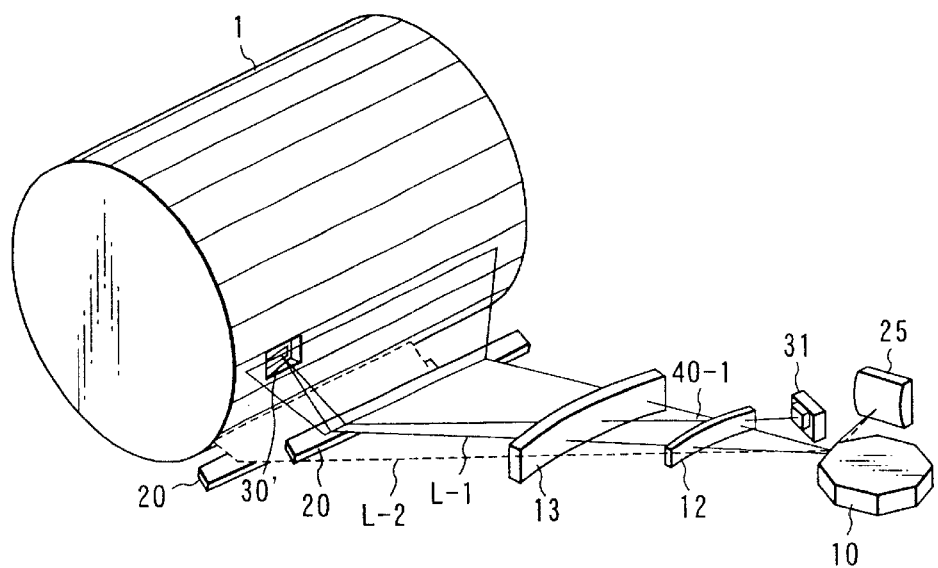
FIGS. 23A and 23B are a perspective view showing the arrangement of main part of a color image forming apparatus according to the eighth embodiment of the present invention and an enlarged view of the optical reflection surfaces, respectively.
Figure 23B:
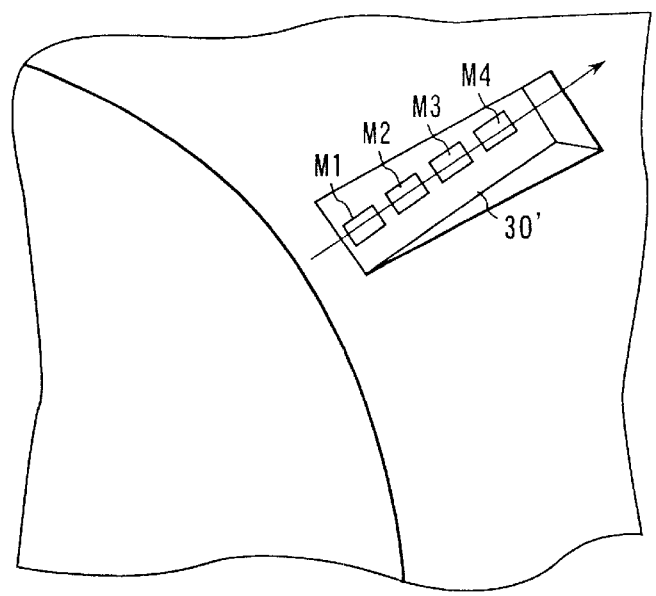

As shown in FIG. 23A, the basic arrangement of the color image forming apparatus of the eighth embodiment is the same as in the first embodiment (FIG. 4) except the structure of a reflection surface 30'. FIG. 23B is an enlarged view showing details of the reflection surface 30'.

In this embodiment, four small reflection members M1 to M4 having a size of 0.1-mm square are arranged to be close each other in the main scanning direction of the laser beams. The members are arranged at an interval of 0.8 mm such that the laser scanning position is more than the maximum error amount. When a laser beam scans the small reflection members M1 to M4, reflected light beams corresponding to the reflection members are obtained. These reflected light beams are detected by a photodetector 31 to obtain reflected light detection signal pulses. An image formation start signal is generated on the basis of the pulses.

The reflection surface 30' is tilted with respect to the drum surface such that a reflected light beam 40-1 irradiates the light-receiving surface of the photodetector 31 at almost the same position as that of a polygon mirror deflection surface 10, as shown in FIG. 6B. More specifically, a trench portion 33 is formed in the bare portion of a photosensitive drum 1 to form the reflection surface 30'. A transparent cover member 32 formed from an acrylic material is buried in the trench portion to prevent the reflectance from lowering due to dirt on the transparent cover member 33 by foreign substances such as a developer.

A method of generating an image formation timing signal in a direction, e.g., sub-scanning direction perpendicular to laser beam scanning in this embodiment will be described next.

As shown in FIG. 2, a reflection mirror 47 and a photodetector 46 for receiving a laser beam at every laser beam scanning time are arranged upstream in the main scanning direction of the photosensitive drum 1 independently of the photodetector for detecting the reflected light beams reflected by the reflection members M1 to M4 on the photosensitive drum surface.

Figure 24:
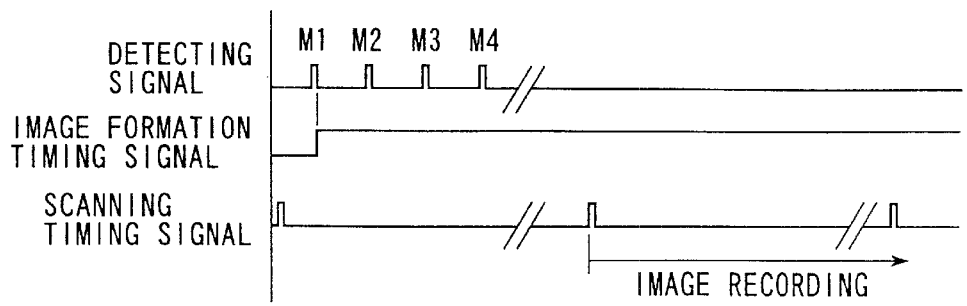
FIG. 24 is a timing chart for explaining the start of image recording in the eighth embodiment.
Figure 26:
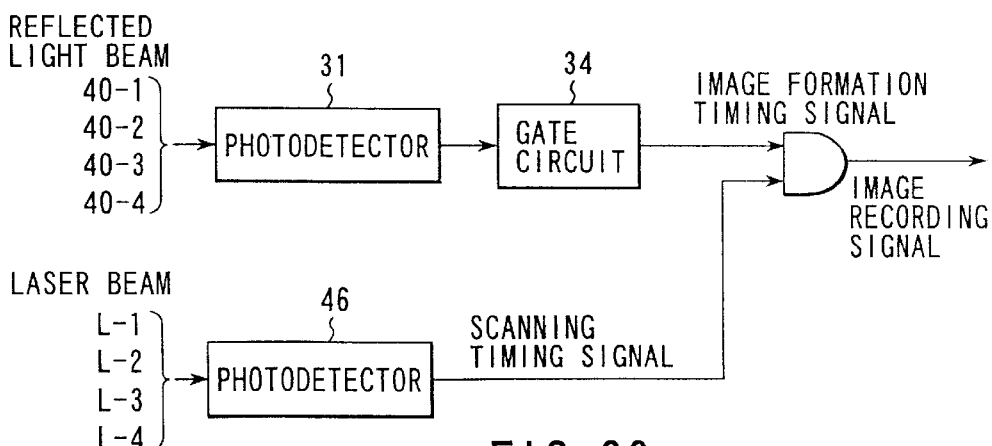
FIG. 26 is a circuit block diagram for generating an image recording signal in the eighth embodiment.

When an image is to be formed on the photosensitive drum 1 by laser beam scanning, a scanning timing signal synchronized with scanning is obtained from the photodetector 46 at every scanning time. On the other hand, every time a laser beam passes the four reflection members M1 to M4 shown in FIG. 23B, pulse signals corresponding to the reflection member positions are obtained. FIG. 24 is a timing chart of these signals. FIG. 26 shows a circuit block for generating these signals.

Referring to FIGS. 24 and 26, a gate circuit 34 generates an image formation timing signal which is inverted at the first pulse edge of the reflected beam detection signal obtained by the photodetector 31. After the image formation timing signal is inverted, an image is recorded from the time of the pulse edge of the scanning timing signal obtained from the photodetector 46.

According to this arrangement, even if a reflected light beam with a sufficient light amount is not generated because of toner attaching to one of the reflection members M1 to M4 on the photosensitive drum surface, the image formation timing signal can be generated on the basis of a reflected light beam from another reflection member.

Figure 25:
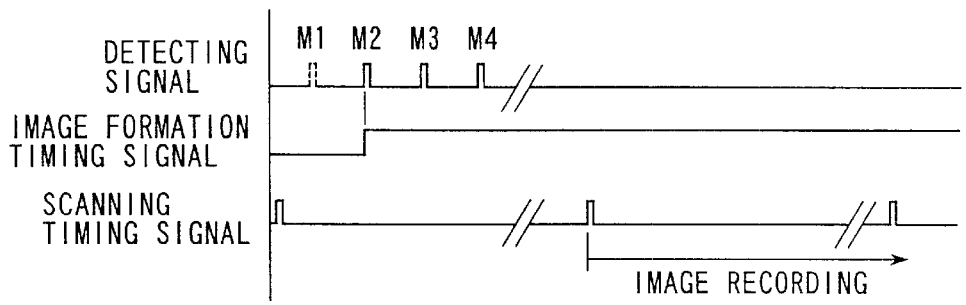
FIG. 25 is a timing chart for explaining a case wherein a detection signal is partially omitted in the eighth embodiment.

FIG. 25 is a timing chart when the reflection surface of one of the reflection members M1 to M4 is dirty, and no reflected light beam detection signal is obtained. Even if the first detection signal is not obtained, the image formation timing signal can be generated because the second, third, and fourth signals are obtained. Hence, the scanning timing signal for recording the image is obtained, as in a case wherein the reflected light beam from each reflection surface is normally detected.

With this arrangement, the image write start position in the sub-scanning direction can be reliably determined without posing any problem due to dirt on the reflection surface. In addition, the image registration accuracy of images of the respective colors can be maintained high.

The method of determining the exposure timing (image formation timing) in synchronism with the detection signal from the photodetector 31 is the same as that described in the first embodiment with reference to FIG. 8. The timings for forming four color images are the same as in FIG. 9. The timing for forming a single-color image is shown in the timing chart of FIG. 24.

In the eighth embodiment, since laser light sources for forming single-color images are driven, the single-color images are formed on the photosensitive drum at the same position with respect to the laser beam reflection surface 30'. Hence, the registration error is rarely recognized in the registered color image, and a high-quality output color image can be obtained.

The arrangement of this embodiment has one reflection surface 30' and one photodetector 31. The method of generating the image write start timing signal in the main scanning direction of the laser beam is the same as that described in the fifth embodiment (FIGS. 19 and 20). When this method is applied to the arrangement of this embodiment having one reflection surface 30, and one photodetector 31, the image position in the direction (sub-scanning direction) perpendicular to the main scanning direction is corrected by the scheme described in the first embodiment.

The method of generating an image write start timing signal in the main scanning direction of the laser beam will be described next.

The main-scanning image write start timing is determined by the scanning signal from the photodetector 46. On the basis of the rotational speed of the polygon motor for driving the polygon mirror and the positional relationship of the photodetector 46, a laser beam is turned on to irradiate the photodetector 46, thereby obtaining the scanning signal.

The image formation timing, i.e., the laser beam drive timing is controlled by generating a laser ON/OFF signal corresponding to image data after predetermined delay times dy, dm, dc, and dk from the edge of the scanning signal generated every time a laser beam scans. By setting the delay times dy, dm, dc, and dk in units of single-color images, the image formation position in the main scanning direction can be shifted.

The main scanning position of each single-color image is determined on the basis of the time interval between the scanning signal and a signal obtained when the photodetector 31 detects a reflected light beam. The timing chart of these signals is the same as that in FIG. 20.

When the time between the scanning timing signal and the detection signal from the photodetector 31 is counted in accordance with the clock count value between the edges of the signals, a laser arrival time from the photodetector 46 (FIG. 2) for generating the scanning timing signal to the reflection surface 30' of the photosensitive drum surface is obtained. The delay times dy, dm, dc, and dk shown in FIG. 19 are changed such that the single-color images are formed at a predetermined position in the main scanning direction with respect to the reflection surface 30'. With this correction sequence, the single-color images are formed at the same position in the main scanning direction, and no registration error is generated in the color image.

Figures 27A, 27B:
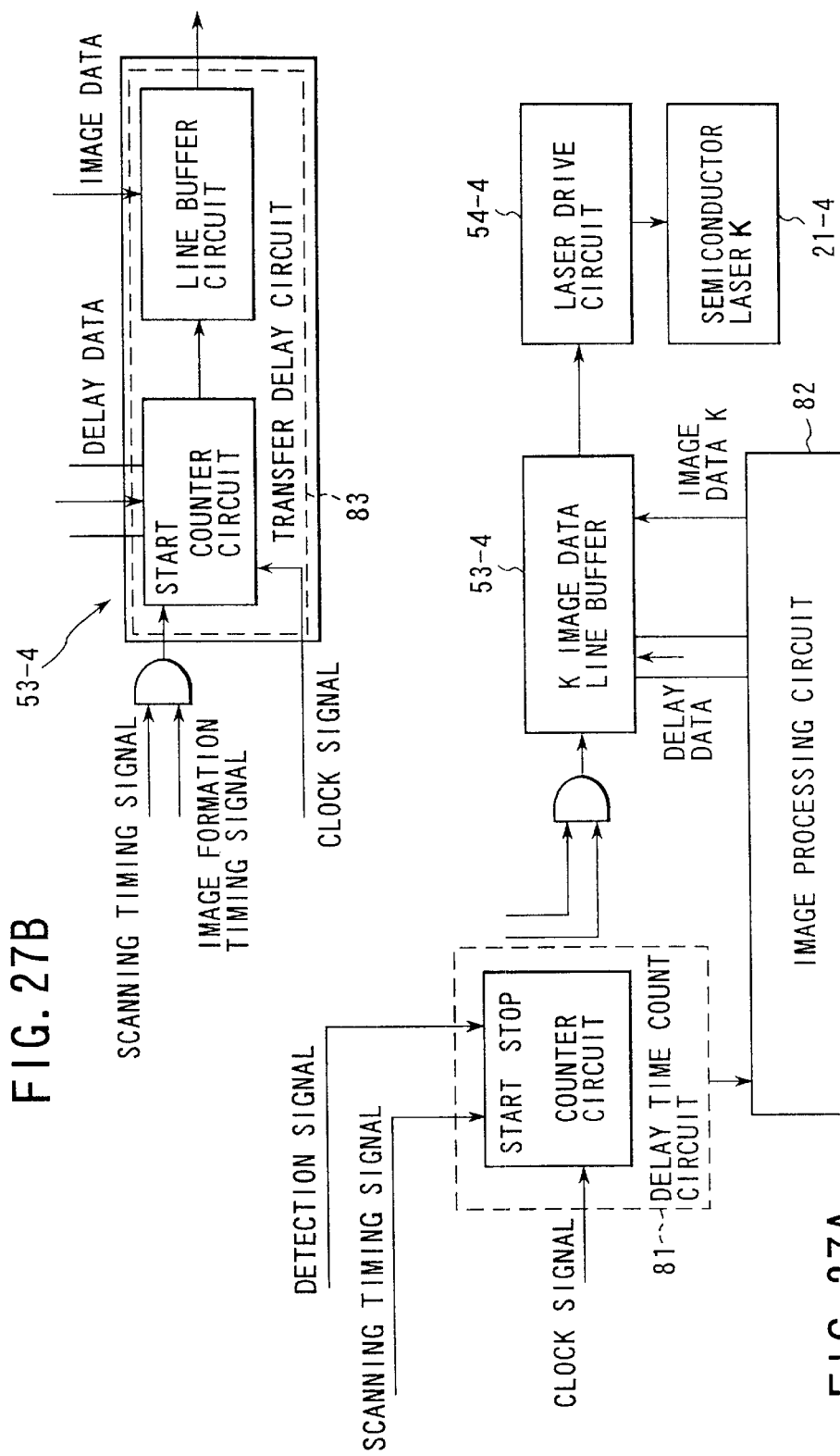
FIGS. 27A and 27B are circuit block diagrams for implementing image formation in the main scanning direction in the eighth embodiment.

The method of setting the delay times dy, dm, dc, and dk will be described next in more detail with reference to FIGS. 27A and 27B. FIG. 27B is a view showing an image data line buffer in FIG. 27A in more detail.

Referring to FIG. 27A, the time from the pulse edge of the scanning timing signal to the laser beam reflected light detection pulse edge is counted by a delay time count circuit 81. The counted reference clock data is received by an image processing circuit 82. The image processing circuit 82 calculates the delay time for the transfer start timing for transferring image data of one laser scanning cycle to a laser drive circuit 54-4 and sets the delay time data dy, dm, dc, and dk in the start counter circuit in a transfer delay circuit 83 arranged in an image line buffer 53-4.

For the descriptive convenience, only the line buffer circuit for black image data is illustrated in FIG. 27A. Actually, similar circuits are prepared for yellow, magenta, and cyan image data. In this embodiment, the delay time count circuit 81 need not be prepared for each beam because the delay times for laser beams for forming yellow, magenta, cyan, and black images are not simultaneously counted.

The delay times are set in this way. When the reflection surface is contaminated with toner or the like, and a reflected light beam in a sufficient light amount is not obtained, the image formation position cannot be accurately determined. In this embodiment, however, since the plurality of reflection members M1 to M4 are used, as shown in FIG. 23B, a plurality of reflected light beam detection signals are obtained, as shown in FIG. 20.

Figure 28:
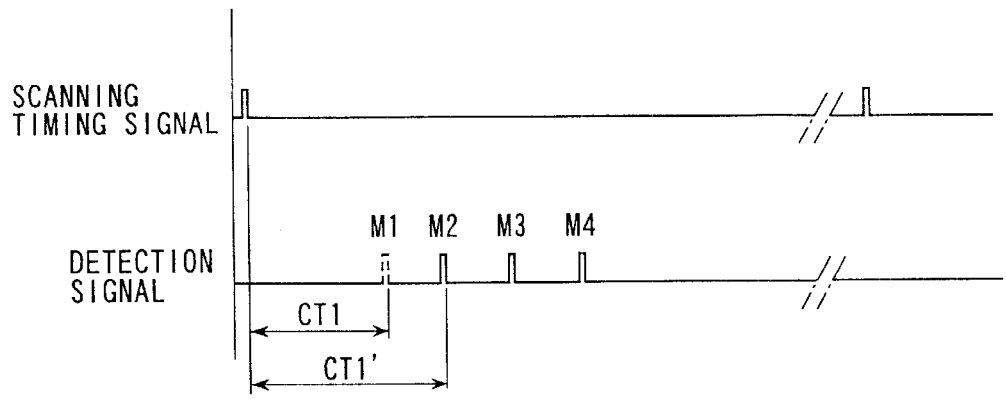
FIG. 28 is a timing chart for explaining a case wherein a detection signal is partially omitted in the eighth embodiment.

FIG. 28 shows a case wherein the first reflection member M1 has no sufficient reflectance because of dirt, and no detection signal is obtained. In this case, the delay time count circuit 81 counts the time from the scanning timing signal edge to the reflected light beam detection signal pulse edge from the second reflection member M2 to obtain data CT1'.

When the first reflection member M1 is normal, the counted delay time is CT1. The delay time for image data transfer is obtained by multiplying the value CT1 by a predetermined delay time dt for forming an image from a position separated from the first reflection member M1 by a predetermined distance. In this embodiment, the distance between the reflection members is set to be larger than the distance in which the laser beam can vary. For this reason, by determining the length of a delay time CT' with the image processing circuit, the ordinal number of the reflection member corresponding to the detection signal pulse can be determined.

In this embodiment, even when the detection signal from the first reflection member M1 is not obtained, it is determined on the basis of the length of the delay time CT' that the detection signal by the second reflection member M2 is the first signal from the laser signal edge. When the delay time for image data transfer is obtained by subtracting a time d1 in which the laser beam passes between the first and second reflection members from the counted delay time CT' and adding the calculation result to the above-described predetermined delay time dt, the image formation start position is accurately determined using the first reflection member M1 as a reference.

In this embodiment, only a laser beam corresponding to a single-color image has been described. For laser beams corresponding to the remaining colors, the same processing is executed. Since the image formation positions can be determined using the first reflection member M1 as a reference, the image registration accuracy in the registered images can be made very high. Additionally, even when the reflection surface is partially dirty, reliable registration can be realized.

(Ninth Embodiment)

Figure 29:
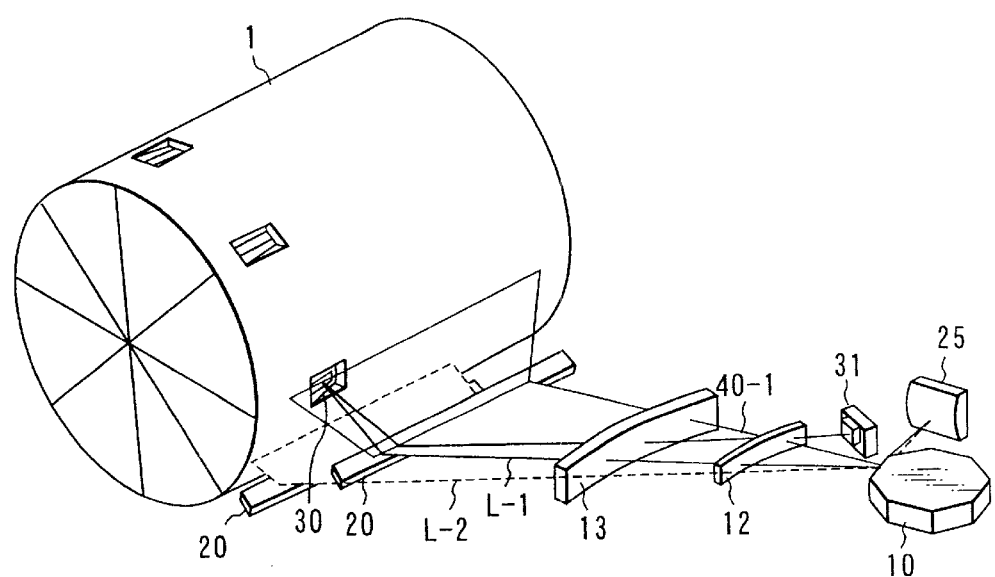
FIG. 29 is a perspective view showing the arrangement of main part of a color image forming apparatus according to the ninth embodiment of the present invention.

FIG. 29 shows the ninth embodiment of the present invention.

In this embodiment, laser beam reflection members M1 to M4 are located on the outer surface of a photosensitive drum every 45° in the rotational direction.

Immediately before the image formation timing, the image write start timings for the yellow, magenta, cyan, and black images corresponding to the first, second, third, and fourth laser beams are determined on the basis of a reflected light beam detection signal from a reflection member as a reference closest to the first laser beam, respectively.

The photosensitive drum need not be excessively rotated to generate each image formation timing signal. When the photosensitive drum is rotated through only 45° at maximum to generate the image write start timing signal for the first laser beam, an image write start signal can be obtained. The wasteful time until image formation can be shortened, and the time of the recording process can be shortened.

In addition to the eighth or ninth embodiment, the plurality of reflection members M1 to M4 may be provided at the two end portions of the photosensitive drum such that the registration error due to the tilt of the laser beam scanning position or registration error due to a laser beam scanning width magnification error can be corrected using reflected light beam detection signals from the reflection members. In these cases as well, the above-described method can be used.

In the eighth and ninth embodiments, electrostatic latent image formation elements by a laser beam have been described. However, the present invention is not particularly limited to the laser optical system. For example, the present invention can also be applied to electrostatic latent image formation elements by a line head such as an LED head.

In the above embodiments, a photodetector formed from a silicon photodiode is used as a photodetection means. However, any other element as a means for receiving a laser beam and converting it into an electrical signal can be used.

According to the above-described eighth and ninth embodiments of the present invention, the photosensitive drum as an electrostatic latent image carrier has, at part of its surface, a plurality of members for reflecting a laser beam. A color image is formed on the basis of detection signals of the reflected light beams from the plurality of reflection members. For this reason, accurate and reliable image registration can be realized without generating any reflected light beam detection error due to dirt by, e.g., toner. Consequently, a high-quality color image can be obtained. In addition, since the toner mark for detecting a registration error is unnecessary, wasteful toner consumption, mark detection means, and mark cleaning means are not required, resulting in reduction of apparatus cost and running cost.

(10th Embodiment)

Figure 30:
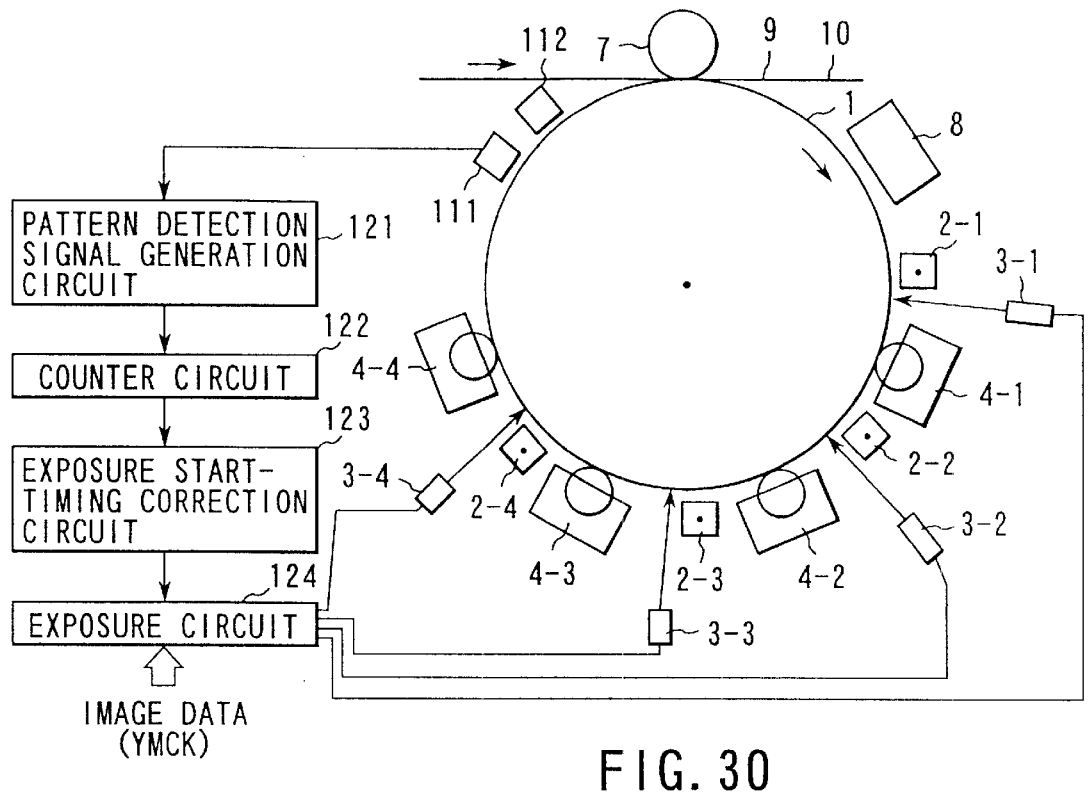
FIG. 30 is a view showing the schematic arrangement of a color image forming apparatus according to the 10th embodiment of the present invention.

FIG. 30 is a view showing the arrangement of an image forming apparatus according to the 10th embodiment of the present invention.

Referring to FIG. 30, a photosensitive drum 1 as an electrostatic latent image carrier is rotatably constructed by forming an organic or amorphous-silicon-based photosensitive layer on the surface of a cylindrical conductive base. The photosensitive drum 1 sequentially passes charging, exposure, and development stations at four positions around the photosensitive drum 1, which are separated in the direction of rotation/movement (clockwise direction in FIG. 30 that will be referred to as a sub-scanning direction hereinafter), while being rotated by a motor (not shown) in the direction of the arrow.

The photosensitive layer of the photosensitive drum 1 is uniformly charged by a first charger 2-1 as a corona charger or a scorotron charger and irradiated with a laser beam modulated in accordance with the first color image information (e.g., yellow image data) by a first laser exposure device 3-1 ahead of the charger 2-1 in the sub-scanning direction. The first electrostatic latent image is formed on the surface of the photosensitive layer by exposure. After this, a first developing unit 4-1 storing a liquid developer of first color (e.g., yellow) and located ahead of the laser exposure device 3-1 in the sub-scanning direction develops the electrostatic latent image formed by the first laser exposure device 3-1. A toner image of first color is formed as a visible image.

The photosensitive drum 1 is uniformly charged by a second charger 2—2. The second electrostatic latent image is formed in the same area as that of the first electrostatic latent image by a second laser exposure device 3-2 in accordance with the second color image information (e.g., magenta image data). After this, the electrostatic latent image is developed by a second developing unit 4-2 storing a liquid developer of second color (e.g., magenta), which is different from the developer stored in the first developing unit 4-1, to form a toner image of second color as a visible image. After this development, the toner image of first color and that of second color are formed on the photosensitive drum 1 in a registration.

A third charger 2-3 uniformly charges the photosensitive drum, the third electrostatic latent image is formed by a third laser exposure device 3—3 in accordance with the third color image information (e.g., cyan image data), and a toner image of third color (e.g., cyan) is formed by a third developing unit 4-3. Finally, a fourth charger 2-4 uniformly charges the photosensitive drum, the fourth electrostatic latent image is formed by a fourth laser exposure device 3-4 modulated in accordance with the fourth color image information (e.g., black image data), and a toner image of fourth color (e.g., black) is formed by a fourth developing unit 4-4.

In this way, the toner images of four colors, e.g., yellow (Y), magenta (M), cyan (C), and black (K) are registered on the photosensitive drum 1 to form a full-color image.

The color image on the photosensitive drum 1 is transferred to recording paper 9 conveyed on a convey path 10 by a transfer unit constituted by a press roller 7. The laser exposure devices 3-1 to 3-4 are driven by an exposure circuit 124 to perform exposure (form the electrostatic latent images). The exposure circuit 124 drives the laser exposure devices 3-1 to 3-4 such that exposure starts at a timing determined by an exposure start timing correction circuit 123 as will be described later.

The color image forming apparatus of the 10th embodiment is based on the above-described second multiple-development scheme using the laser exposure devices 3-1 to 3-4 and developing units 4-1 to 4-4 in correspondence with the colors. Hence, there are requirements to eliminate the relative positional errors of the color toner images due to the relative positional errors of the laser exposure devices 3-1 to 3-4, assembly error, or a change in use environment or a change over time and ensure a sufficient registration accuracy of the toner images.

For these requirements, in the 10th embodiment, the relative difference between the toner image formation positions of the respective colors is calculated/detected before color image formation, and the relative positions of the electrostatic latent images formed by the laser exposure devices 3-1 to 3-4 are corrected such that the relative difference becomes zero by the following method. To detect the sub-scanning relative difference between the color toner image formation positions, band-shaped detection patterns P-1 to P-4 as shown in FIG. 31 are formed on the photosensitive drum 1 along a direction (axial direction of the photosensitive drum 1=main scanning direction) perpendicular to the sub-scanning direction by the laser exposure devices 3-1 to 3-4 as electrostatic latent images.

Figure 31:
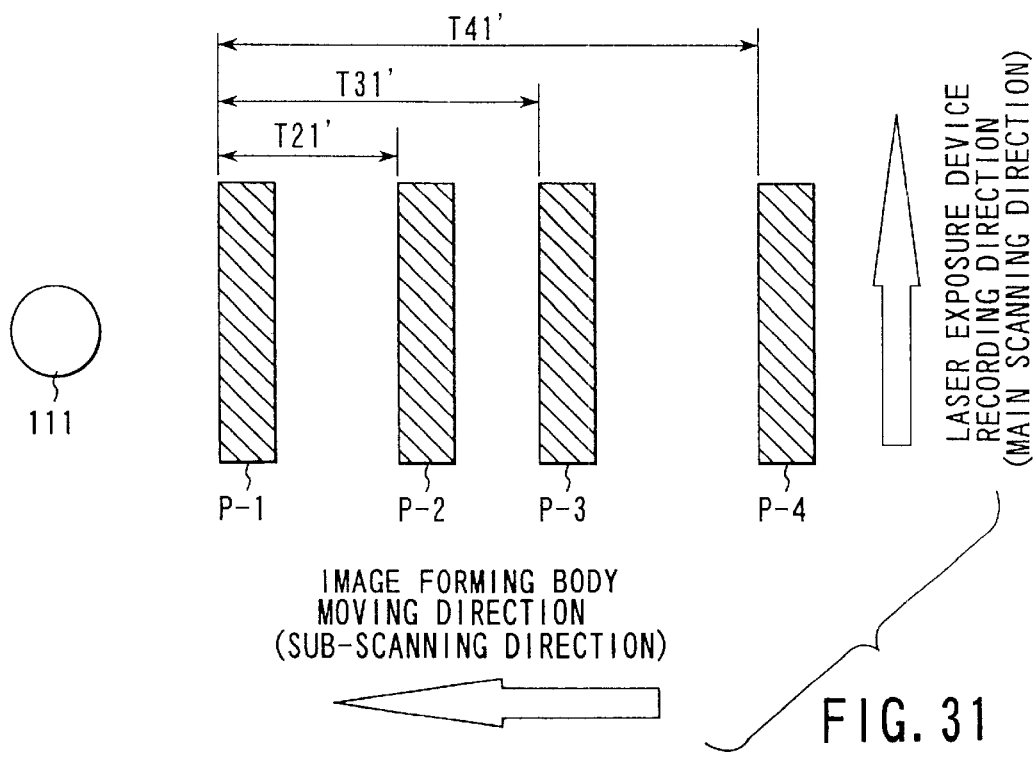
FIG. 31 is a view for explaining detection patterns and a method of correcting the electrostatic latent image formation position in the sub-scanning direction in the 10th embodiment.

First, the detection pattern P-1 is formed on the photosensitive drum 1 by the laser exposure device 3-1 as an electrostatic latent image and developed into a visible image by the developing unit 4-1, as shown in FIG. 31. Next, the similar detection pattern P-2 is formed on the photosensitive drum 1 by the laser exposure device 3-2 as an electrostatic latent image at a timing delayed from first exposure start timing (electrostatic latent image formation start timing) T0 by the laser exposure device 3-1 by a predetermined time T21, and developed into a visible image by the developing unit 4-2. In a similar manner, the detection patterns P-3 and P-4 are formed on the photosensitive drum 1 by the laser exposure devices 3—3 and 3-4 as electrostatic latent images at timings delayed from the first exposure start timing T0 by predetermined times T31 and T41 and developed into visible images by the developing units 4-3 and 4-4, respectively.

The pieces of information at the times T21, T31, and T41 are stored in the exposure start timing correction circuit 123 in advance. The exposure circuit 124 drives the laser exposure device 3-1 and then sequentially drives the laser exposure devices 3-2, 3—3, and 3-4 at the above timings on the basis of the information at the times T21, T31, and T41.

The detection patterns P-1 to P-4 need not be developed by all the developing units 4-1 to 4—4. The detection patterns may be developed using a toner of color that is readily detected by a pattern detector 111, e.g., a color with which the difference between the output from the pattern detector 111 on the surface of the photosensitive drum 1 and the output from the pattern detector 111 that has detected a detection pattern P is maximized.

After the detection patterns P-1 to P-4 are formed on the photosensitive drum 1, the pattern detector 111 detects the detection patterns P-1 to P-4 and outputs an electrical signal whose level changes in correspondence with the detection patterns P-1 to P-4. The pattern detector 111 may irradiate the photosensitive drum 1 with light, like an optical fiber sensor, detect the light amount of the reflected light beam using a photoelectric conversion element (photodetector), and detect a detection pattern on the basis of the change in light-receiving amount. Alternatively, the pattern detector 111 may sense the detection pattern using a CCD line sensor or CCD area sensor.

In the scheme in which the photosensitive drum 1 is irradiated with light to detect the detection patterns P-1 to P-4 with the pattern detector 111, and the reflected light beams from the detection patterns P-1 to P-4 are detected, light having a wavelength shifted from a wavelength at which the photosensitive drum 1 is highly sensitive is preferably used as the irradiation light. With this setting, degradation in the photosensitive layer of the photosensitive drum 1 due to irradiation light from the pattern detector 111 can be suppressed.

The detection patterns P-1 to P-4 are detected by the pattern detector 111 and then removed by a cleaning unit 112 set on the photosensitive drum 1 before the detection patterns are transferred to the recording paper 9.

The cleaning unit 112 may have a mechanism detachable from the surface of the photosensitive drum 1. The detection patterns are removed only when the cleaning unit 112 comes into contact with the surface of the photosensitive drum 1 in detecting the patterns (e.g., when the color image forming apparatus is activated or in the stand-by state).

The press roller 7 may be detachable from the surface of the photosensitive drum 1 via the recording paper 9. Only when the patterns are to be detected, the press roller 7 is separated from the recording paper 9, and the detection patterns on the photosensitive drum 1 are removed by a cleaner 8.

Alternatively, a paper sheet for pattern removal may be used in place of the recording paper 9 only when the patterns are detected.

The output signal from the pattern detector 111 is input to a pattern detection signal generation circuit 121 and, e.g., binarized to generate a pattern detection signal. Assume that the detection patterns P-1, P-2, P-3, and P-4 are formed on the photosensitive drum 1 in this order in the sub-scanning direction. Every time the pattern detector 111 detects the detection patterns P-1 to P-4, a pattern detection signal is generated from the pattern detection signal generation circuit 121. The pattern detection signal is input to a counter circuit 122.

The counter circuit 122 counts a detection time interval T21' between the detection patterns P-1 and P-2, a detection time interval T31' between the detection patterns P-1 and P-3, and a detection time interval T41' between the detection patterns P-1 and P-4 on the basis of the pattern detection signals. The count result from the counter circuit 122 is input to an exposure start timing correction circuit 123.

On the basis of equations (1), the exposure start timing correction circuit 123 obtains, as shifts from the original exposure start timing (to be referred to as exposure start timing shifts hereinafter), differences $\Delta T21$, $\Delta T31$, and $\Delta T41$ between the times T21, T31, and T41 from the exposure start timing T0 when the detection pattern P-1 is formed by the laser exposure device 3-1 to the exposure start timing when the detection patterns P-2, P-3, and p-4 are formed by the laser exposure devices 3-2, 3-3, and 3-4, respectively and the detection time intervals T21', T31', and T41' obtained by the counter circuit 122.

$$\Delta T21 = T21 - T21'$$

$$\Delta T31 = T31 - T31'$$

$$\Delta T41 = T41 - T41' \qquad (1)$$

The exposure start timing correction circuit 123 also calculates the correction amounts for the exposure start timings T21, T31, and T41 of the laser exposure devices 3-2, 3—3, and 3-4 from the exposure start timing T0 of the laser exposure device 3-1 on the basis of the exposure start timing shifts $\Delta T21$, $\Delta T31$, and $\Delta T41$.

If there are no relative positional errors of the laser exposure devices 3-1 to 3-4 or assembly error, or no change in use environment or change over time, T21=T21', T31=T31', and T41=T41'. In fact, the exposure start timing shifts $\Delta T21$, $\Delta T31$, and $\Delta T41$ are generated due to the above reasons. The positions of the electrostatic latent images formed by the laser exposure devices 3-1 to 3-4 shift because of the exposure start timing shifts $\Delta T21$, $\Delta T31$, and $\Delta T41$.

In actual image formation, on the basis of the exposure start timing shifts $\Delta T21$, $\Delta T31$, and $\Delta T41$ detected in the above way, i.e., information of the relative positions of the electrostatic latent images formed by the laser exposure devices 3-1 to 3-4, the exposure start timing correction circuit 123 corrects time intervals Ts21, Ts31, and Ts41 from the exposure start timing of the laser exposure device 3-1 to the exposure start timings of the laser exposure devices 3-2, 3—3, and 3-4 as follows.

$$Ts21 = T21 + \Delta T21$$

$$Ts31 = T31 + \Delta T31$$

$$Ts41 = T41 + \Delta T41 \qquad (2)$$

By correcting the exposure start timings, the relative positions of the electrostatic latent images formed by the laser exposure devices 3-1 to 3-4 in the sub-scanning direction can match with each other. As a result, the sub-scanning positional shifts of the toner images of the respective colors can be corrected.

The detection patterns P-1 to P-4 may be formed a plurality of number of times. In this case, for each of the detection patterns P-1 to P-4 formed a plurality of number of times, the counter circuit 122 obtains the detection time intervals T21', T31', and T41', and the representative values or average values are applied to T21', T31', and T41' in equations (1) to obtain the exposure start timing shifts $\Delta T21$, $\Delta T31$, and $\Delta T41$. In addition, on the basis of equations (2), the corrected time intervals Ts21, Ts31, and Ts41 are obtained. With this arrangement, the influence of a variation in rotational speed of the photosensitive drum 1 can be reduced, and the correction accuracy for the relative positions of the electrostatic latent images can be increased.

(11th Embodiment)

The 11th embodiment of the present invention will be described next with reference to FIG. 32.

The arrangement of a color image forming apparatus of the 11th embodiment is the same as that of the 10th embodiment except the shape of a detection pattern and processing by an exposure start timing correction circuit 123.

Figure 32:
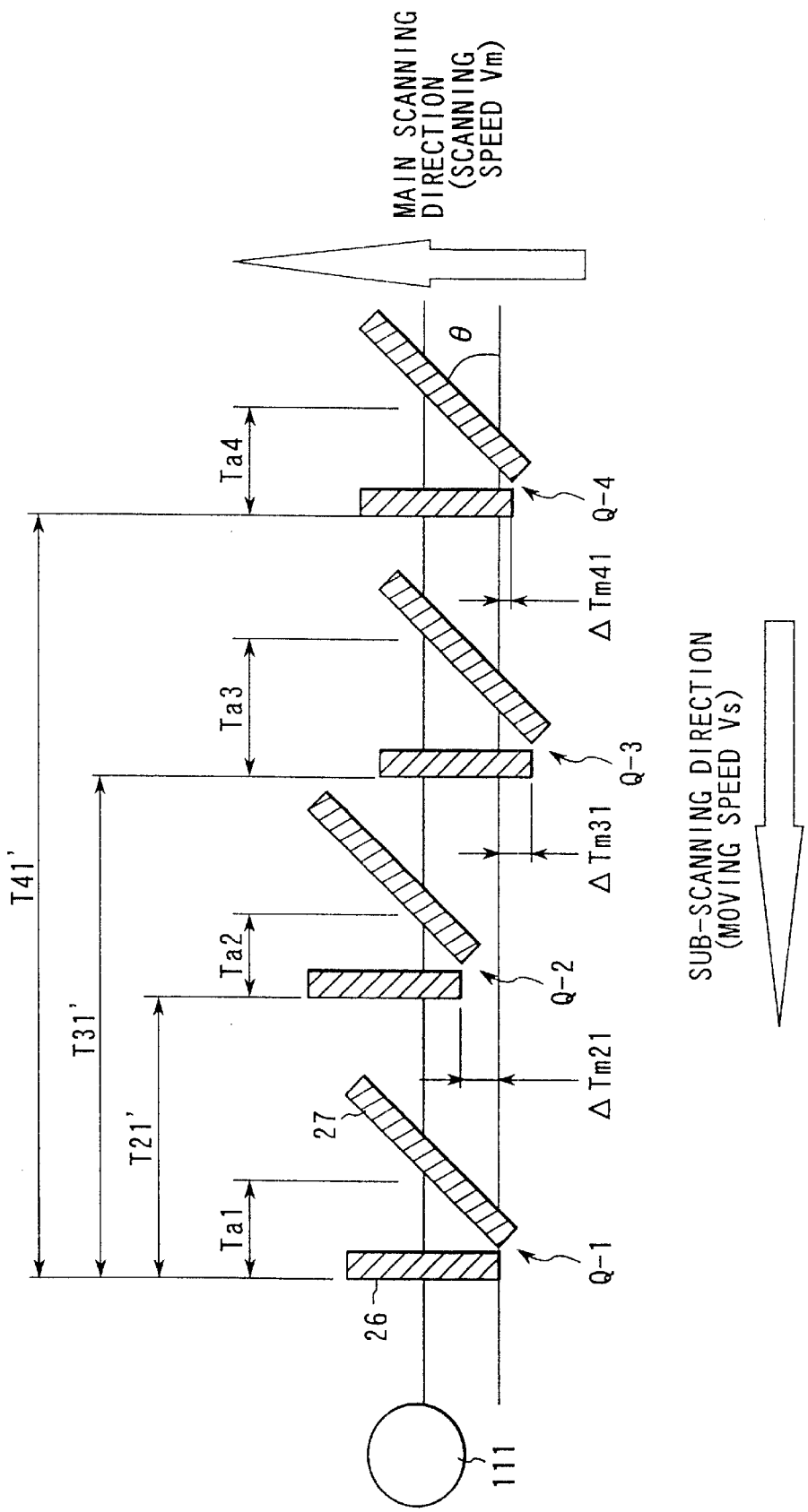
FIG. 32 is a view for explaining detection patterns and a method of correcting the electrostatic latent image formation position in the sub-scanning and main scanning directions in the 11th embodiment of the present invention.

FIG. 32 is a view for explaining the detection patterns and a method of correcting the relative positions of electrostatic latent images in the 11th embodiment.

With the detection patterns P-1 to P-4 shown in FIG. 31, the relative positions of the electrostatic latent images can be corrected only in the sub-scanning direction. In the 11th embodiment, each of detection patterns Q-1 to Q-4 is formed by combining a band-shaped pattern 26 parallel to the main scanning direction and an oblique band-shaped pattern 27 having a predetermined angle θ with respect to the main scanning direction. With these detection patterns, the relative positions of electrostatic latent images can be corrected in both the sub-scanning and main scanning directions.

The detection patterns Q-1 to Q-4 of this embodiment are formed following the same procedures as in the 10th embodiment. First, the detection pattern Q-1 is formed by a laser exposure device 3-1 as an electrostatic latent image and developed into a visible image by a developing unit 4-1. After this, the detection patterns Q-2, Q-3, and Q-4 are formed by laser exposure devices 3-2, 3—3, and 3-4 as electrostatic latent images at timings delayed from an exposure start timing T0 of the detection pattern Q-1 by times T21, T31, and T41 and developed into visible images by developing units 4-2, 4-3, and 4—4, respectively.

The detection patterns Q-1 to Q-4 formed on a photosensitive drum 1 are detected by a pattern detector 111. A pattern detection signal is generated by a pattern detection signal generation circuit 121 on the basis of the output from the pattern detector 111. A counter circuit 122 obtains detection time intervals T21', T31', and T41' of the band-shaped patterns 26 parallel to the main scanning direction of the remaining detection patterns Q-2, Q-3, and Q-4 using, as a reference, a pattern detection signal corresponding to the pattern 26 in the detection pattern Q-1. In addition, detection time differences Ta1, Ta2, Ta3, and Ta4 between the band-shaped patterns 26 parallel to the main scanning direction in the detection patterns Q-1, Q-2, Q-3, and Q-4 and the band-shaped patterns 27 oblique to the main scanning direction are obtained.

The method of correcting the relative positions of the electrostatic latent images in the sub-scanning direction is the same as in the 10th embodiment.

More specifically, exposure start timing shifts $\Delta T21$, $\Delta T31$, and $\Delta T41$ in the sub-scanning direction are given by equations (3), like equations (1).

$$\Delta T21 = T21 - T21'$$

$$\Delta T31 = T31 - T31'$$

$$\Delta T41 = T41 - T41' \quad (3)$$

On the basis of the exposure start timing shifts $\Delta T21$, $\Delta T31$, and $\Delta T41$, the exposure start timing correction circuit 123 corrects time intervals Ts21, Ts31, and Ts41 from the exposure start timing of the laser exposure device 3-1 to the exposure start timings of the laser exposure devices 3-2, 3—3, and 3-4 as follows.

$$Ts21 = T21 + \Delta T21$$

$$Ts31 = T31 + \Delta T31$$

$$Ts41 = T41 + \Delta T41 \quad (4)$$

The method of correcting the relative positions of the electrostatic latent images in the main scanning direction in this embodiment will be described next.

As described above, from the pattern detection signal corresponding to the detection pattern Q-1, the counter circuit 122 obtains, for the detection pattern Q-1, a detection time difference Ta1 between the band-shaped pattern 26 parallel to the main scanning direction and the band-shaped pattern 27 oblique to the main scanning direction. For the remaining detection patterns Q-2, Q-3, and Q-4 as well, detection time difference Ta2, Ta3, and Ta4 between the band-shaped patterns 26 parallel to the main scanning direction and the band-shaped patterns 27 oblique to the main scanning direction are obtained from the corresponding pattern detection signals.

As shown in equations (5), differences Ta21, Ta31, and Ta41 between the detection time difference Ta1 and the detection time differences Ta2, Ta3, and Ta4 are obtained.

$$Ta21 = Ta2 - Ta1$$

$$Ta31 = Ta3 - Ta1$$

$$Ta41 = Ta4 - Ta1 \quad (5)$$

Let Vs be the sub-scanning speed (relative moving speed of the photosensitive drum 1), and Vimg be the image formation speed in the main scanning direction. On the basis of the time differences Ta21, Ta31, and Ta41, exposure start timing shifts $\Delta Tm21$, $\Delta Tm31$, and $\Delta Tm41$ by the laser exposure devices 3-2, 3—3, and 3-4 from the exposure start timing of the laser exposure device 3-1 are given by equations (6).

$$\Delta Tm21 = Vs \cdot Ta21/\tan \theta/Vimg$$

$$\Delta Tm31 = Vs \cdot Ta31/\tan \theta/Vimg$$

$$\Delta Tm41 = Vs \cdot Ta41/\tan \theta/Vimg \quad (6)$$

In accordance with the exposure start timing shifts $\Delta Tm21$, $\Delta Tm31$, and $\Delta Tm41$, the exposure start timings of the laser exposure devices 3-2, 3—3, and 3-4 with respect to the exposure start timing of the laser exposure device 3-1 are corrected in the main scanning direction. The relative positions of the electrostatic latent images in the main scanning direction can be corrected.

In this embodiment, by using the detection patterns shown in FIG. 32, the relative positions of the electrostatic latent image formed by the laser exposure devices 3-1 to 3-4 can be corrected in the sub-scanning and main scanning directions. Hence, the registration accuracy of the toner images of the respective colors can be further increased.

(12th Embodiment)

A method of correcting the tilt of an electrostatic latent image formation position in the main scanning direction will be described next as the 12th embodiment of the present invention.

Figure 33:
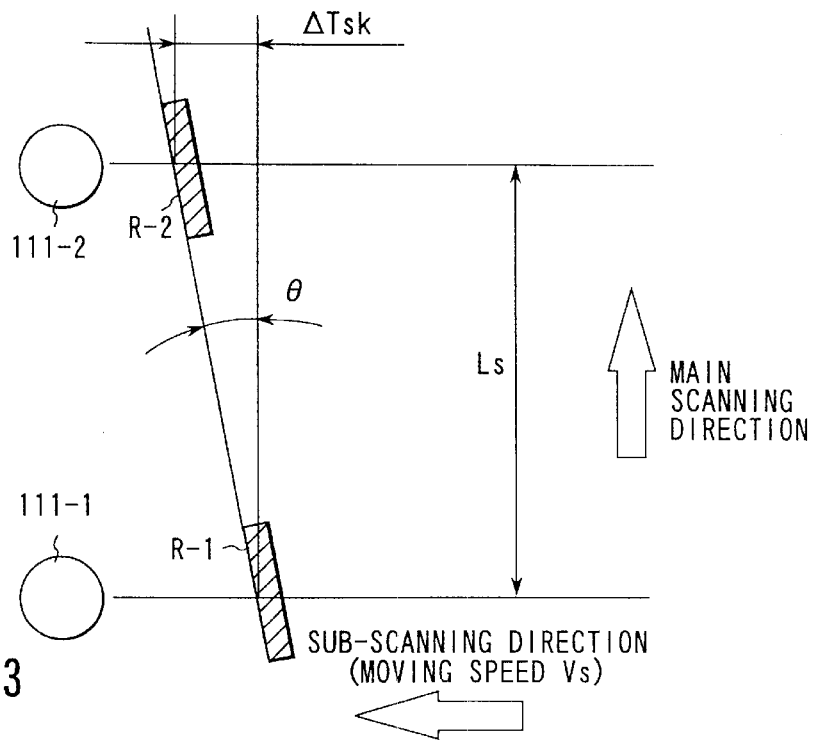
FIG. 33 is a view for explaining detection patterns and a method of correcting main-scanning tilt of the electrostatic latent image formation position in the 12th embodiment of the present invention.

FIG. 33 is a view for explaining detection patterns and the method of correcting main-scanning tilt of an electrostatic latent image formation position in the 12th embodiment. The color image forming apparatus of this embodiment has the same arrangement as that of the 10th embodiment except the arrangement of a pattern detector.

In the 12th embodiment, one of laser exposure devices 3-1 to 3-4 shown in FIG. 30, e.g., the laser exposure device 3-1 forms detection patterns R-1 and R-2 as band-shaped patterns on both sides of the image area in the main scanning direction. Pattern detectors 111-1 and 111-2 are located at positions where the detection patterns R-1 and R-2 can be detected. The output signals from the pattern detectors 111-1 and 111-2 are input to a pattern detection signal generation circuit 121, so pattern detection signals corresponding to the detection patterns R-1 and R-2 are generated. These pattern detection signals are input to a counter circuit 122.

The counter circuit 122 obtains a time difference (the difference between the detection timings of the detection patterns R-1 and R-2 by the pattern detectors 111-1 and 111-2) $\Delta Tsk$ between the pattern detection signal corresponding to the detection pattern R-1 and that corresponding to the detection pattern R-2. A tilt angle $\theta$ of the electrostatic latent image formation position in the main scanning direction is obtained by an arithmetic circuit (not shown) on the basis of the tilt angle $\Delta Tsk$. More specifically, let Ls be the distance between the pattern detectors 111-1 and 111-2 in the main scanning direction, and Vs be the relative moving sped of a photosensitive drum 1. At this time the tilt angle $\theta$ of the electrostatic latent image formation position in the main scanning direction is given by $$\theta = \arctan(\Delta Tsk \cdot Vs/Ls) \quad (7)$$

On the basis of the measurement result of the tilt angle $\theta$, (a) optical system components such as a mirror in the laser exposure devices 3-1 to 3-4 are moved and adjusted, or (b) the positions of the laser exposure devices 3-1 to 3-4 themselves are moved and adjusted using a driving source such as a piezoelectric element, thereby correcting the tilt of the electrostatic latent image position in the main scanning direction.

Figure 34:
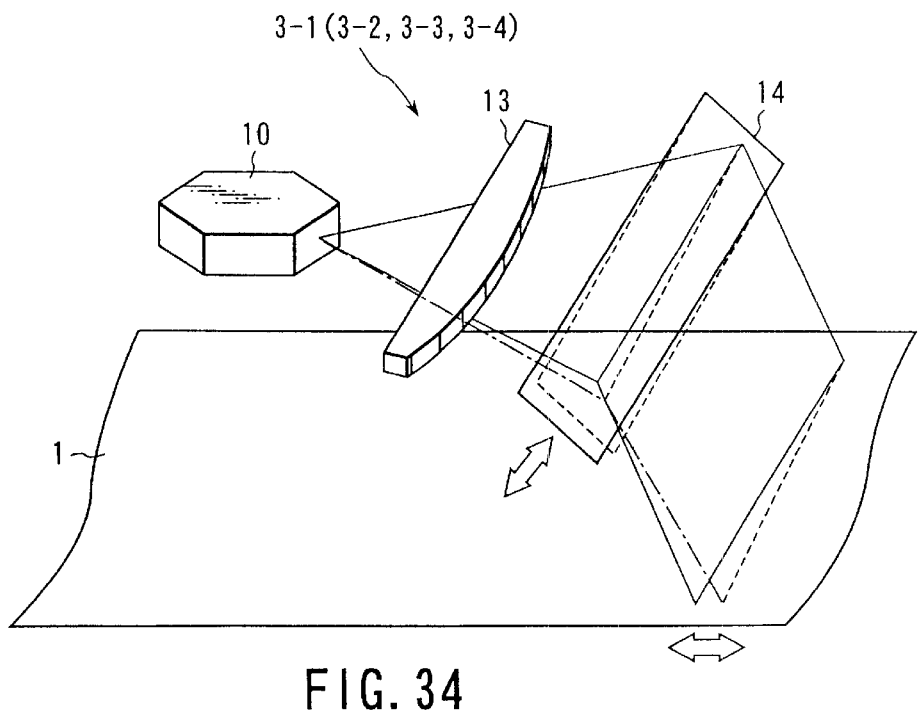
FIG. 34 is a perspective view showing the arrangement of part of a color image forming apparatus according to the 12th embodiment.

FIG. 34 shows the example (a). A mirror 14 is added to each of the laser exposure devices 3-1 to 3-4 constructed by an optical system of a polygon mirror (rotary polyhedral mirror) 10, an f-θ lens 13, and the like. The mirror 14 is moved and adjusted in the direction of the arrow by a piezoelectric element or another driving source in accordance with the calculation result of the tilt angle θ, thereby correcting the tilt of the electrostatic latent image position in the main scanning direction.

Instead of using such optical/mechanical method, image data to be supplied to an exposure circuit 124 can be rotated through the tilt angle θ by image processing to correct the tilt of the electrostatic latent image position in the main scanning direction.

(13th Embodiment)

Figure 35:
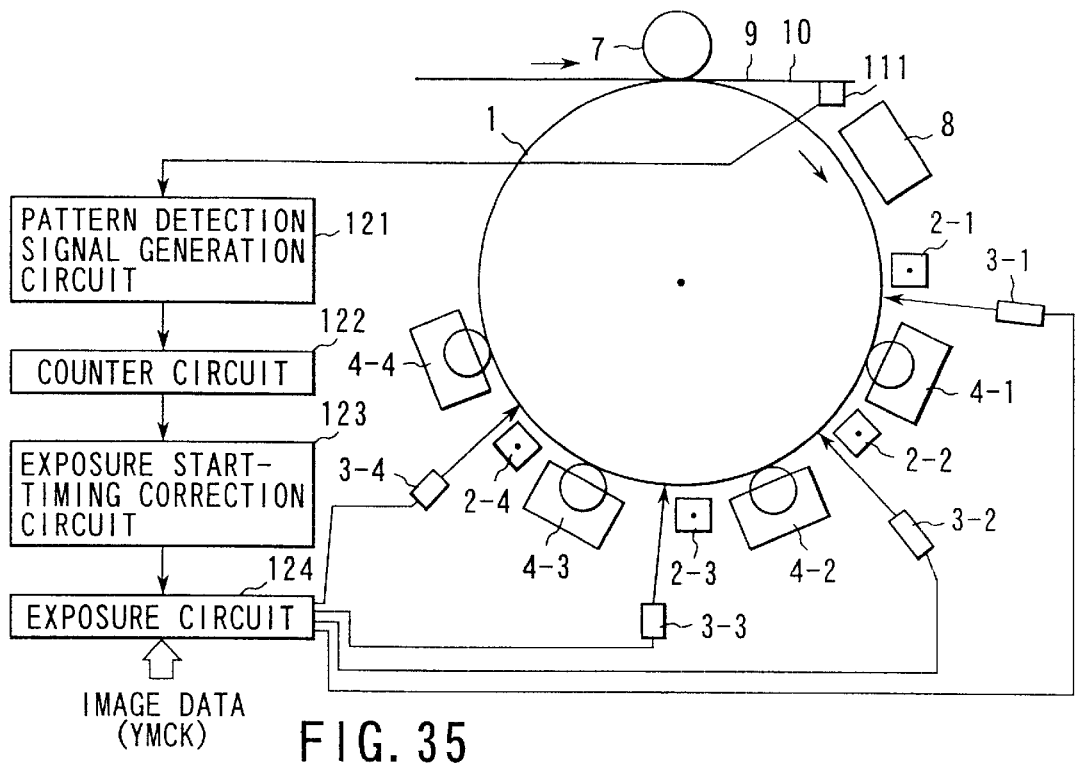
FIG. 35 is a view showing the schematic arrangement of a color image forming apparatus according to the 13th embodiment of the present invention.

FIG. 35 shows the arrangement of a color image forming apparatus according to the 13th embodiment of the present invention.

The same reference numerals as in FIG. 30 denote the same parts in FIG. 35, and only the difference from the 10th to 12th embodiments will be described.

In the 10th embodiment, the pattern detector 111 opposes the photosensitive drum 1. In the 13th embodiment, a pattern detector 111 opposes the surface of recording paper 9 conveyed through a convey path 10. The pattern detector 111 detects a detection pattern after it is transferred to the recording paper 9. In this case, the detection pattern is transferred to the recording paper 9 and output. For this reason, the detection pattern is preferably formed when the user of the apparatus does not use the color image forming apparatus.

The arrangement of the 13th embodiment can be combined with not only the 10th embodiment but also the 11th or 12th embodiment.

(14th Embodiment)

Figure 36:
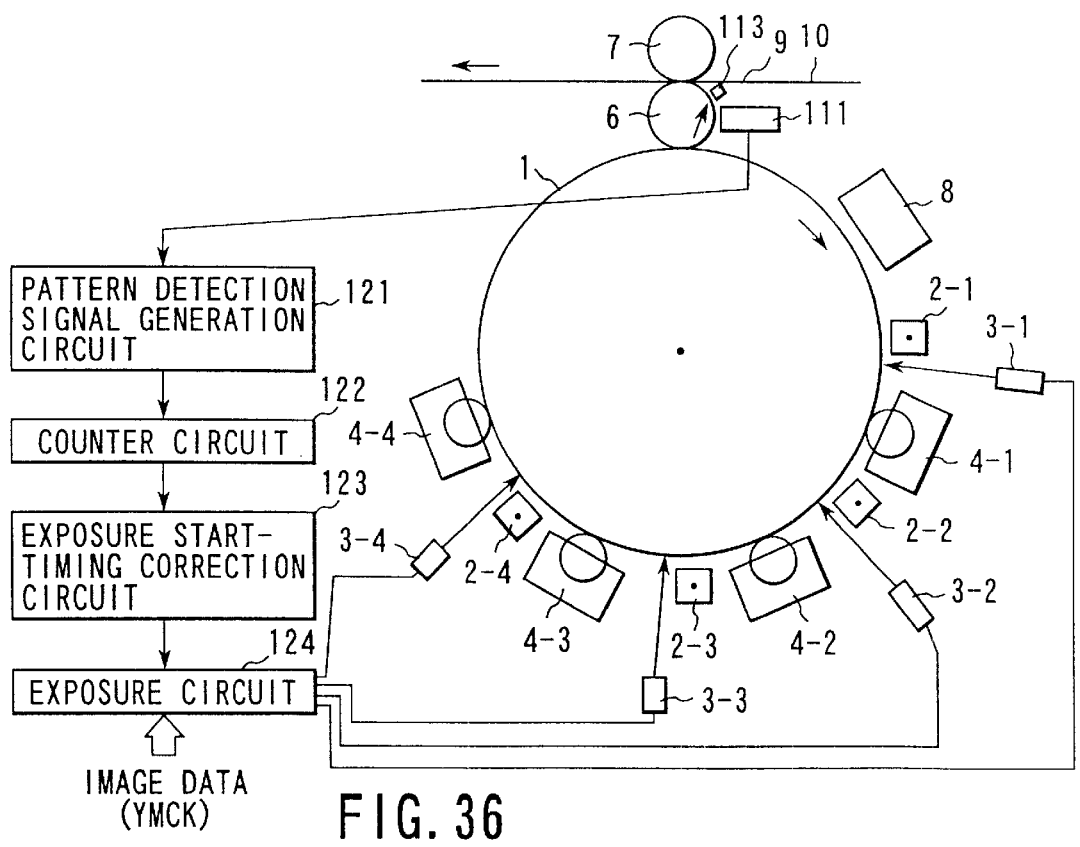
FIG. 36 is a view showing the schematic arrangement of a color image forming apparatus according to the 14th embodiment of the present invention.

FIG. 36 is a view showing the arrangement of a color image forming apparatus according to the 14th embodiment of the present invention. In this example, the color image on a photosensitive drum 1 is not directly transferred to recording paper 9 but temporarily transferred to an intermediate transfer medium 6 and then to the recording paper 9.

A pattern detector 111 opposing the intermediate transfer medium 6 detects detection patterns transferred from the photosensitive drum 1 to the intermediate transfer medium 6. After the detection patterns transferred to the intermediate transfer medium 6 are detected by the pattern detector 111, the detection patterns on the intermediate transfer medium 6 are immediately removed by a cleaning unit 113.

The cleaning unit 113 may have a mechanism detachable from the surface of the intermediate transfer medium 6. The detection patterns are removed only when the cleaning unit 113 comes into contact with the surface of the intermediate transfer-medium 6 in detecting the patterns (e.g., when the color image forming apparatus is activated or in the stand-by state).

A press roller 7 may be detachable from the surface of the intermediate transfer medium 6 via the recording paper 9. only when the patterns are to be detected, the press roller 7 is separated from the recording paper 9, and the detection patterns on the intermediate transfer medium 6 are removed by the cleaning unit 113.

Alternatively, a paper sheet for pattern removal may be used. in place of the recording paper 9 only when the patterns are detected.

To transfer the color image from the photosensitive drum 1 to the intermediate transfer medium 6 and then from the intermediate transfer medium 6 to the recording paper 9, transfer using pressure (and heat) or transfer using an electric field can be used as far as transfer to the media is possible.

(15th Embodiment)

Figure 37:
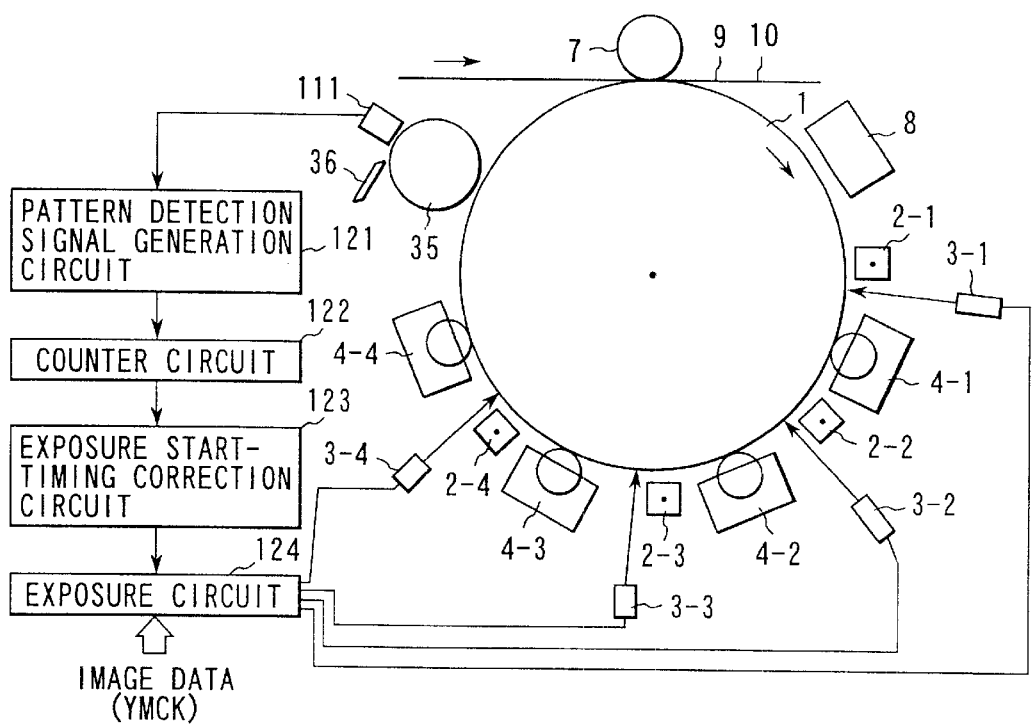
FIG. 37 is a view showing the schematic arrangement of a color image forming apparatus according to the 15th embodiment of the present invention.

FIG. 37 is a view showing the arrangement of a color image forming apparatus according to the 15th embodiment of the present invention.

In this embodiment, a pattern transfer roller 35 is inserted between a developing unit 4—4 for finally developing an image and a press roller 7 as a transfer unit. A pattern detector 111 is located above the pattern transfer roller 35. Detection patterns formed on a photosensitive drum 1 are transferred to the pattern transfer roller 35 and then detected by the pattern detector 111. The detection patterns transferred to the pattern transfer roller 35 are detected by the pattern detector 111 on the pattern transfer roller 35 and removed by a cleaning unit 36.

In this case, the detection accuracy of the pattern detector 111 can be increased by making the surface of the pattern transfer roller 35 have a color with which the detection patterns can be easily detected by the pattern detector 111. When no detection patterns are formed on the pattern transfer roller 35, the pattern transfer roller 35 is released from the photosensitive drum 1 to prevent any image other than detection patterns from being transferred to the pattern transfer roller 35.

The embodiments of the present invention have been described above. The present invention is not limited to the 10th to 15th embodiments, and various changes and modifications can be made.

In the 10th to 15th embodiments, the detection pattern is developed into a visible image, and the detection pattern as a visible image is optically detected by the detector. However, the electrostatic latent image as the detection pattern without being developed may be directly detected by a device such as a surface electrometer for measuring the surface charge amount on the photosensitive drum. When the difference in surface potential on the photosensitive drum is measured to detect the detection pattern, the detection pattern formed on the photosensitive drum by the laser exposure device need not be developed by the developing unit. Hence, the detection pattern need not be removed by the cleaning unit.

In the 10th to 15th embodiments, to correct the relative positions of the electrostatic latent images on the basis of the detection pattern detection result, the exposure start timing of each laser exposure device is corrected in the sub-scanning or main scanning direction. The same result as described above can also be obtained when the mechanical relative positions of the plurality of laser exposure devices are corrected or an optical system component in the laser exposure device having the arrangement as shown in FIG. 34, e.g., the mirror 14 shown in FIG. 34 is moved and adjusted to correct the relative positions of the electrostatic latent images.

In the 10th to 15th embodiments, a photosensitive drum is used as an electrostatic latent image carrier. However, the present invention can also be applied to a color image forming apparatus which uses a belt-shaped carrier and forms an image while moving the carrier.

In the 10th to 15th embodiments, the detection pattern has a band shape wide to some extent. The detection pattern may be a thin line or a solid pattern depending on its shape as long as the pattern can be detected. In addition, the detection pattern formed by each laser exposure device is shifted in the sub-scanning direction. Depending on the shape of the detection pattern or the arrangement of the pattern detector, the detection patterns may be registered.

The present invention can also be applied to a color image forming apparatus for forming a full-color image on an image formation medium by an ink-jet process or the like.

According to the above-described 10th to 15th embodiments of the present invention, visible images of the respective colors can be accurately registered even when there is a relative positional error or assembly error in each image exposure device, or a change in use environment or a change over time, and a high-quality color image can be formed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image forming apparatus comprising:
    a latent image carrier;
    an image exposure mechanism configured to scan a surface of said latent image carrier with exposure light beams in accordance with image information of different colors to form a plurality of latent images;
    a development mechanism configured to develop the plurality of latent images formed by said image exposure mechanism into visible images to form a color image on said latent image carrier;
    at least one reflector provided on said latent image carrier;
    at least one detector for detecting reflected light beams of the exposure light beams from said at least one reflector and outputting a detection signal; and
    a correction mechanism configured to control relative positions of the plurality of latent images to be formed by said image exposure mechanism, on the basis of the detection signal from said at least one detector wherein
    said correction mechanism measures time intervals between reception timing of the detection signal from said at least one detector and start timings of scanning timing signals of the plurality of exposure light beams, and delays timings for supplying the image information of the respective colors to said image exposure mechanism in accordance with the measured time intervals, in order to control the relative positions of the plurality of latent images in a main scanning direction of the exposure light beams, the main scanning direction being perpendicular to a rotational direction of the latent image carrier.

2. An apparatus according to claim 1, wherein said at least one reflector comprises first and second reflection members separated in the main scanning direction of the exposure light beam;
    said at least one detector comprises first and second detection members for detecting reflected light beams of the exposure light beam from said first and second reflection members and outputting detection signals, respectively; and
    said correction mechanism controls the relative positions of the plurality of latent images to be formed by said image exposure mechanism, in accordance with the detection signals from said first and second detection members.

3. An apparatus according to claim 1, wherein said correction mechanism controls an exposure start timing by the exposure light beam on the basis of the detection signal from said at least one detector to control the relative positions of the plurality of latent images in a moving direction of said latent image carrier.

4. An apparatus according to claim 1, wherein said image exposure mechanism has a plurality of light sources, a polygon mirror for simultaneously deflecting light beams from said plurality of light sources to scan the surface of said latent image carrier, and a lens for forming, on said latent image carrier, the images of the light beams deflected by said polygon mirror and uniforming scanning speeds of the light beams; and
    said at least one detector is provided at a position separated from the surface of said latent image carrier by the same distance substantially as that between the surface of said latent image carrier and a deflection surface of said polygon mirror, and light beams reflected by said at least one reflector have passed through said lens.

5. An apparatus according to claim 1, wherein said latent image carrier has a trench portion and said at least one reflector has a reflection member provided on a bottom surface of said trench portion.

6. An apparatus according to claim 5, wherein the bottom surface of the trench portion is tilted with respect to a main scanning direction of the exposure light beams on said latent image carrier.

7. A color image forming apparatus comprising:
    a latent image carrier;
    an image exposure mechanism configured to scan a surface of said latent image carrier with exposure light beams in accordance with image information of different colors to form a plurality of latent images;
    a development mechanism configured to develop the plurality of latent images formed by said image exposure mechanism into visible images to form a color image on said latent image carrier;
    at least one reflector provided on said latent image carrier;
    at least one detector for detecting reflected light beams of the exposure light beams from said at least one reflector and outputting a detection signal; and
    a correction mechanism configured to control relative positions of the plurality of latent images to be formed by said image exposure mechanism, on the basis of the detection signal from said at least one detector, wherein
    said image exposure mechanism has a plurality of light sources for generating exposure light beams, a polygon mirror for simultaneously deflecting the exposure light beams from said plurality of light sources to scan the surface of said latent image carrier, and a plurality of lenses configured to form, on said latent image carrier, the images of the exposure light beams deflected by said polygon mirror and to bring scanning speeds of the light beams into uniformity; and
    said at least one detector is provided at a position onto which the reflected light beams that have passed through at least one of said plurality of lenses or a condenser lens are focused.

8. A color image forming apparatus comprising:

a latent image carrier;

an image exposure mechanism configured to scan a surface of said latent image carrier with exposure light beams in accordance with image information of different colors to form a plurality of latent images;

a development mechanism configured to develop the plurality of latent images formed by said image exposure. mechanism into visible images to form a color image on said latent image carrier;

at least one reflector provided on said latent image carrier;

at least one detector for detecting reflected light beams of the exposure light beams from said at least one reflector and outputting a detection signal; and a correction mechanism configured to control relative positions of the plurality of latent images to be formed by said image exposure mechanism on the basis of the detection signal from said at least one detector wherein said at least one reflector has a reflection member smaller than an allowable registration error value of the color image.

9. A color image forming apparatus comprising:

a latent image carrier;

an image exposure mechanism configured to scan a surface of said latent image carrier with exposure light beams in accordance with image information of different colors to form a plurality of latent images;

a development mechanism configured to develop the plurality of latent images formed by said image exposure mechanism into visible images to form a color image on said latent image carrier;

a reflector provided on said latent image carrier; said reflector having a plurality of reflection members;

a detector for detecting reflected light beams of the exposure light beams from at least one of said plurality of reflection members and outputting a detection signal; and a correction mechanism configured to control relative positions of the plurality of latent images to be formed by said image exposure mechanism, on the basis of the detection signal from said detector, wherein said correction mechanism has a circuit for determining timings for supplying the image information of the respective colors to said image exposure mechanism, on the basis of the detection signal output from said detector.

10. An apparatus according to claim 9, wherein a plurality of reflectors each of which is identical to said reflector are arranged on said latent image carrier separately in a moving direction of said latent image carrier.

* * * * *